US011897650B2

(12) United States Patent
Franke et al.

(10) Patent No.: US 11,897,650 B2
(45) Date of Patent: Feb. 13, 2024

(54) UNPACKING SYSTEM FOR AN OBJECT, IN PARTICULAR A PHARMACEUTICAL OR COSMETIC OBJECT, PACKED IN AN ITEM OF PACKAGING, IN PARTICULAR A POUCH

(71) Applicant: Groninger & Co. GmbH, Crailsheim (DE)

(72) Inventors: Bernd Franke, Wallhausen (DE); Josef Veile, Westhausen (DE)

(73) Assignee: GRONINGER & CO. GMBH, Crailsheim (DE)

( * ) Notice: Subject to any disclaimer, the term of this patent is extended or adjusted under 35 U.S.C. 154(b) by 0 days.

(21) Appl. No.: 17/392,669

(22) Filed: Aug. 3, 2021

(65) Prior Publication Data

US 2021/0362900 A1  Nov. 25, 2021

Related U.S. Application Data

(62) Division of application No. 16/151,592, filed on Oct. 4, 2018, now Pat. No. 11,111,048.

(30) Foreign Application Priority Data

Oct. 6, 2017 (DE) ...................... 10 2017 123 298.2
Oct. 9, 2017 (DE) ...................... 10 2017 123 387.3

(51) Int. Cl.
*B65B 69/00* (2006.01)
*B29C 55/18* (2006.01)
*B65B 11/00* (2006.01)

(52) U.S. Cl.
CPC ...... *B65B 69/0008* (2013.01); *B65B 69/0033* (2013.01); *B65B 69/0041* (2013.01); *B29C 55/18* (2013.01); *B65B 2011/002* (2013.01)

(58) Field of Classification Search
CPC ......... B65B 43/00; B65B 43/26; B65B 43/30; B65B 43/39; B65B 69/00; B65B 69/0008;
(Continued)

(56) References Cited

U.S. PATENT DOCUMENTS 5,375,961 A * 12/1994 Mojden ................... B65B 69/00
414/416.11
6,244,019 B1 * 6/2001 Ljungqvist .............. B65B 69/00
53/384.1
(Continued)

FOREIGN PATENT DOCUMENTS

DE  102007027878 A1  12/2008
DE  102009002441 A1 * 10/2010  ......... B65B 69/0008
(Continued)

OTHER PUBLICATIONS

European Search Report issued for the application EP20177476.7 dated Oct. 9, 2020; 8 pages.
(Continued)

*Primary Examiner* — Jacob A Smith
(74) *Attorney, Agent, or Firm* — REISING ETHINGTON P.C.

(57) ABSTRACT

An unpacking system having a folding-out device for folding outwards an initially folded-in packaging portion of an item of packaging for an object, and having a stretching device for stretching an item of packaging for an object. The item of packaging herein is in particular a pouch, and the object is in particular a pharmaceutical or cosmetic object. The unpacking system furthermore has a transportation installation for transporting the object in a transportation direction. The packaging portion in the stretching device is stretched parallel with the transportation direction. A filling
(Continued)

system is disclosed having such an unpacking system, and methods are disclosed for folding outwards, for stretching, and for unpacking.

7 Claims, 29 Drawing Sheets

(58) Field of Classification Search
CPC ............ B65B 69/0033; B65B 69/0041; B65B 2011/002; B29C 55/18
USPC ........ 53/387.1, 384.1, 386.1, 425, 432, 434, 53/457, 458, 468, 492, 512, 566
See application file for complete search history.

(56) References Cited

U.S. PATENT DOCUMENTS

| | | | |
|---|---|---|---|
| 8,567,031 B1 * | 10/2013 | DeHart | ............... B65B 69/0033 29/426.3 |
| 8,813,464 B2 | 8/2014 | Leidig | |
| 2002/0162303 A1 * | 11/2002 | Skrak | ................. B65B 69/0033 53/381.2 |
| 2012/0023873 A1 | 2/2012 | Leidig | |

FOREIGN PATENT DOCUMENTS

| | | | | |
|---|---|---|---|---|
| DE | 102009002441 | A1 | 10/2010 | |
| DE | 202009005086 | U1 | 12/2010 | |
| DE | 102010063892 | A1 | 6/2012 | |
| DE | 102011080289 | A1 | 2/2013 | |
| DE | 102014201961 | A1 * | 8/2015 | ......... B65B 69/0033 |
| DE | 102014201966 | A1 | 8/2015 | |
| DE | 102014201967 | A1 | 8/2015 | |
| WO | WO1997029956 | A1 | 8/1997 | |
| WO | WO2011012658 | A1 | 2/2011 | |

OTHER PUBLICATIONS

Translation of European Search Report issued for the application EP20177476.7 dated Oct. 9, 2020.
German Examination Report for Application No. 10 2017 123 387.3 dated Jun. 7, 2018, 7 pages.
Translation of German Examination Report for Application No. 10 2017 123 387.3 dated Jun. 7, 2018, 6 pages.
European Search Report issued for the application EP18198880.9 dated Oct. 22, 2019; 12 pages.
English Translation of the European Search Report issued for the application EP18198880.9 dated Oct. 22, 2019; 14 pages.
Partial European Search Report issed for the application EP18198880.9 dated Apr. 12, 2019; 11 pages.
Translation of Partial European Search Report issued for the application EP18198880.9; Apr. 12, 2019; 10 pages.
Office action issued by the German Patent Office issued for the application 102017012236.9 dated Feb. 5, 2021; 7 pages.
English Translation of Office action issued by the German Patent Office issued for the application 102017012236.9 dated Feb. 5, 2021; 4 pages.

* cited by examiner

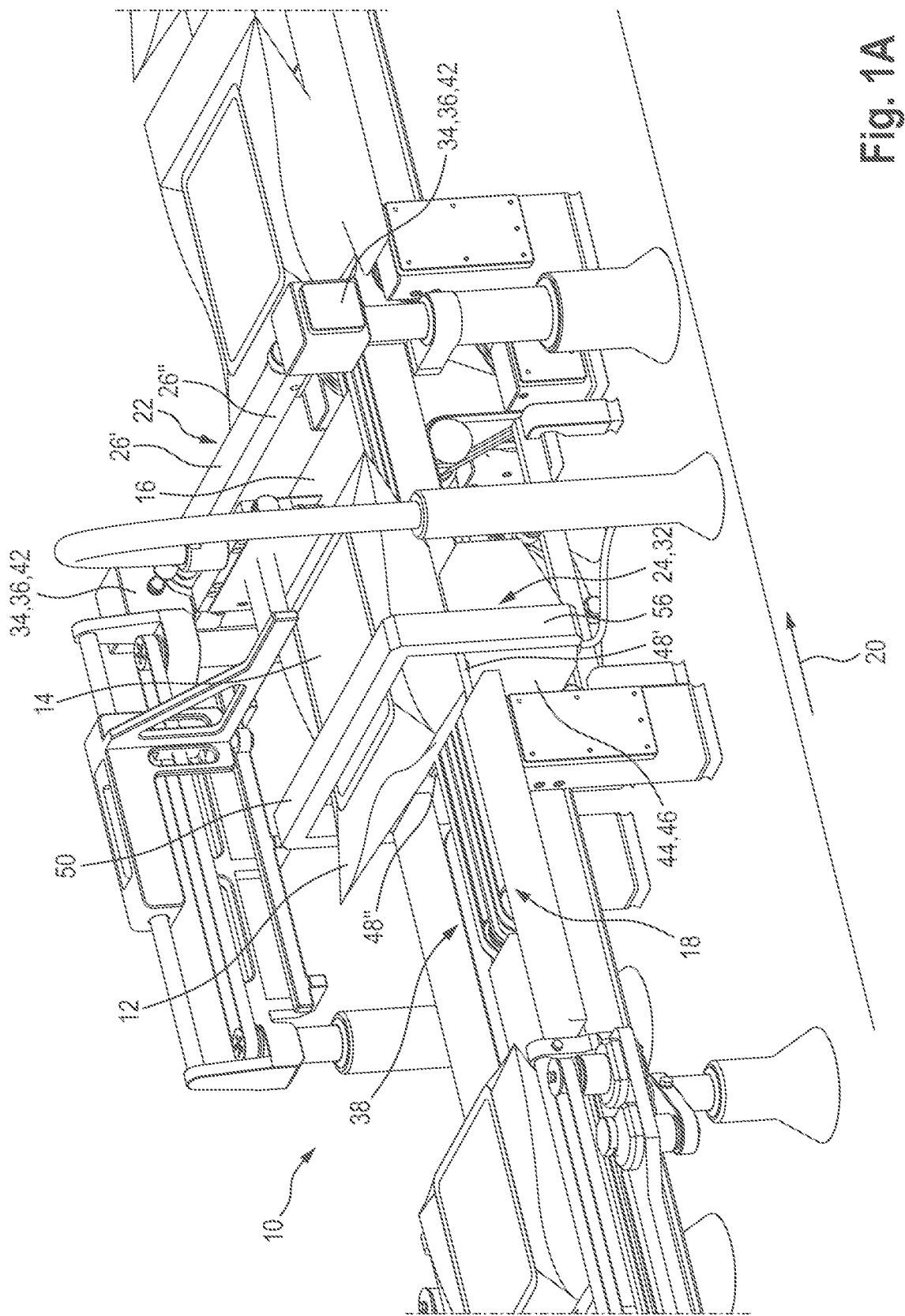

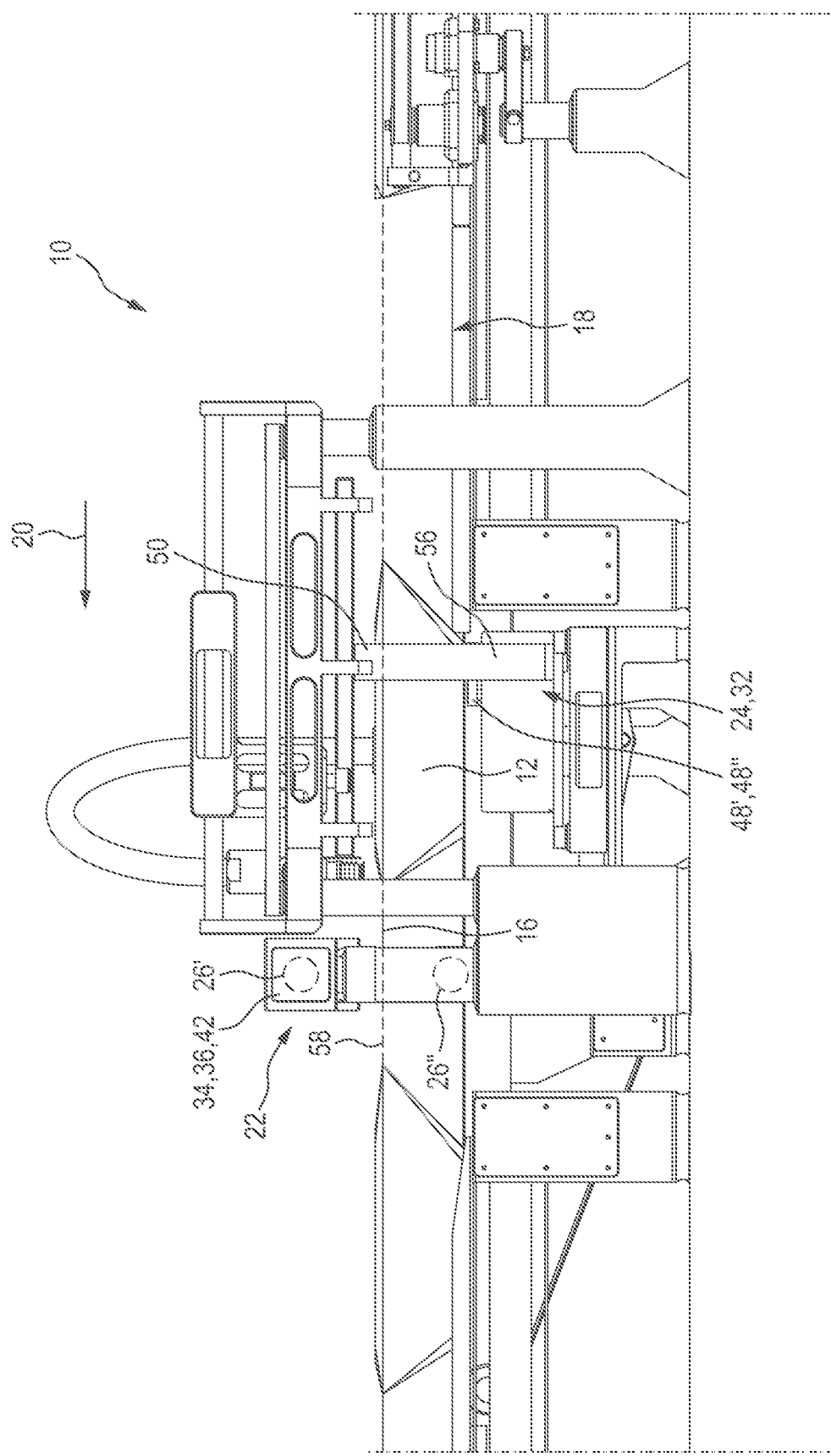

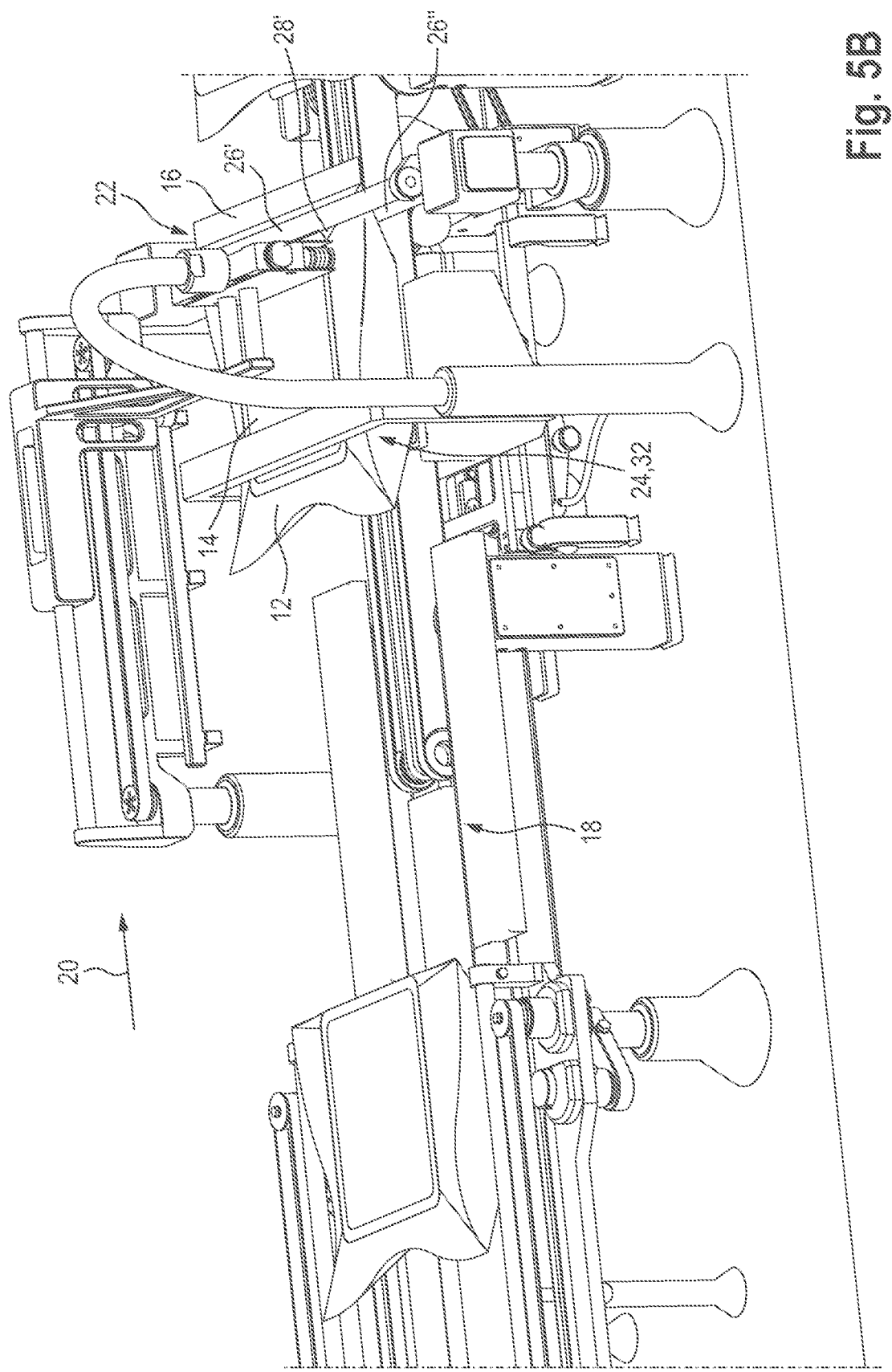

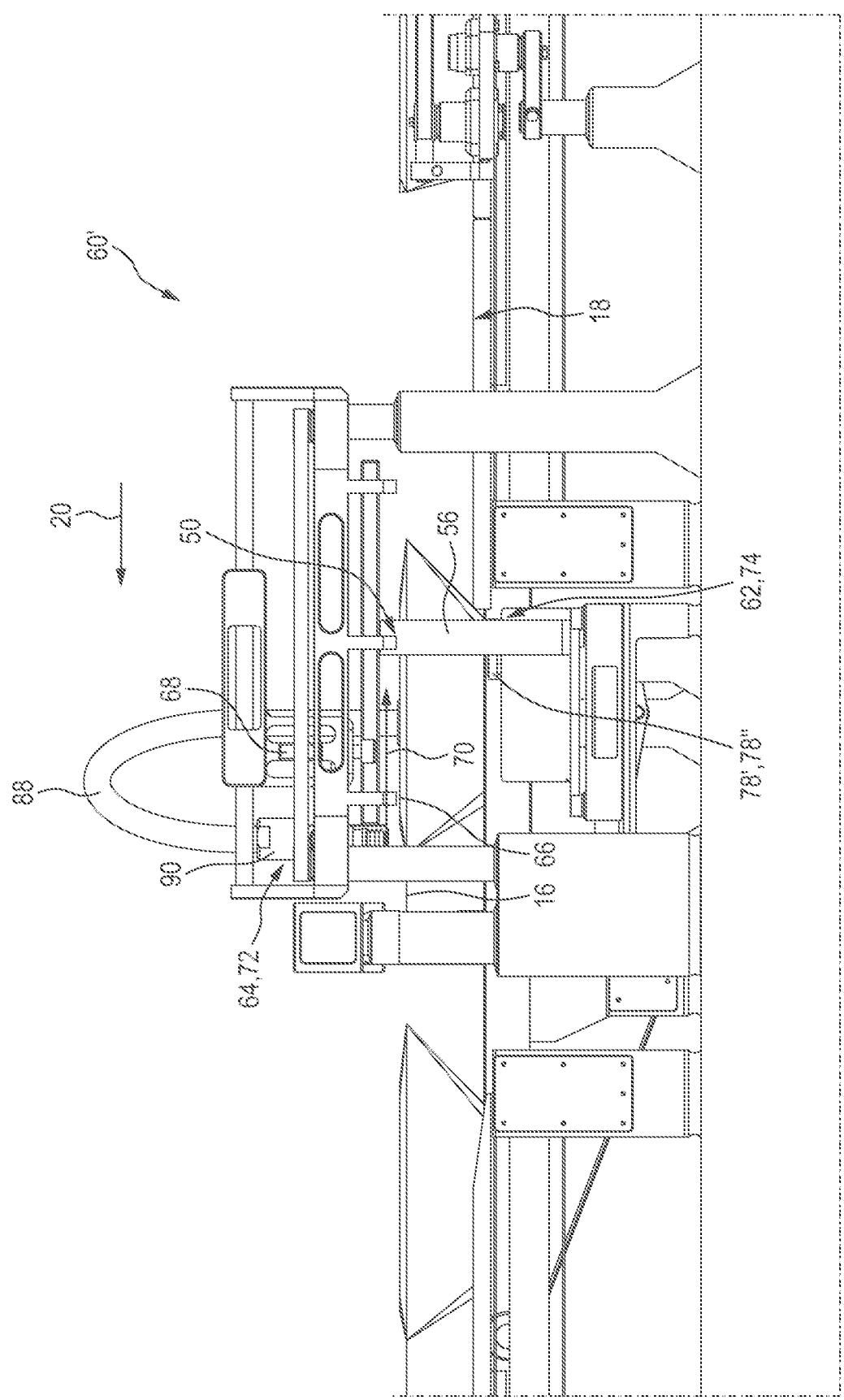

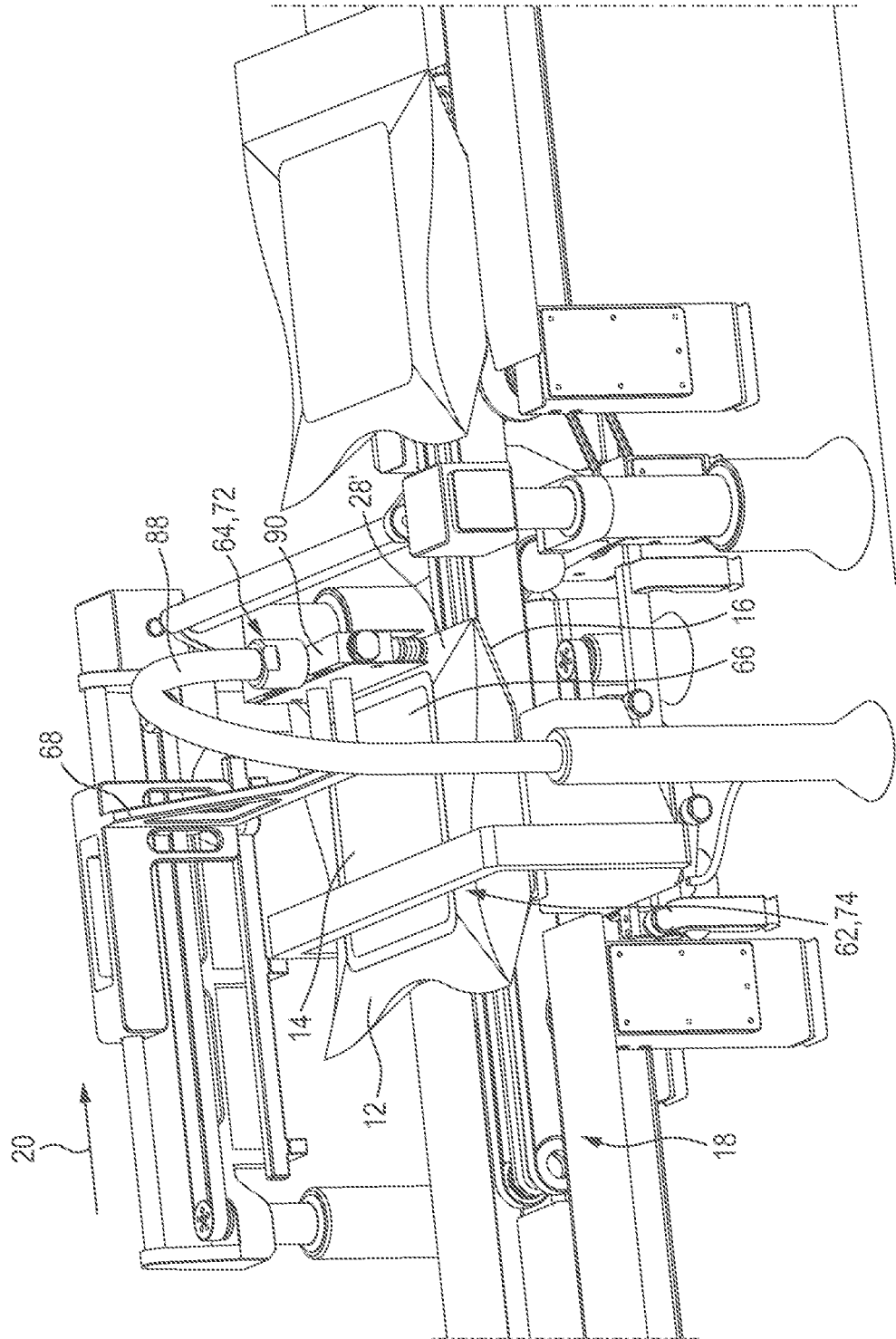

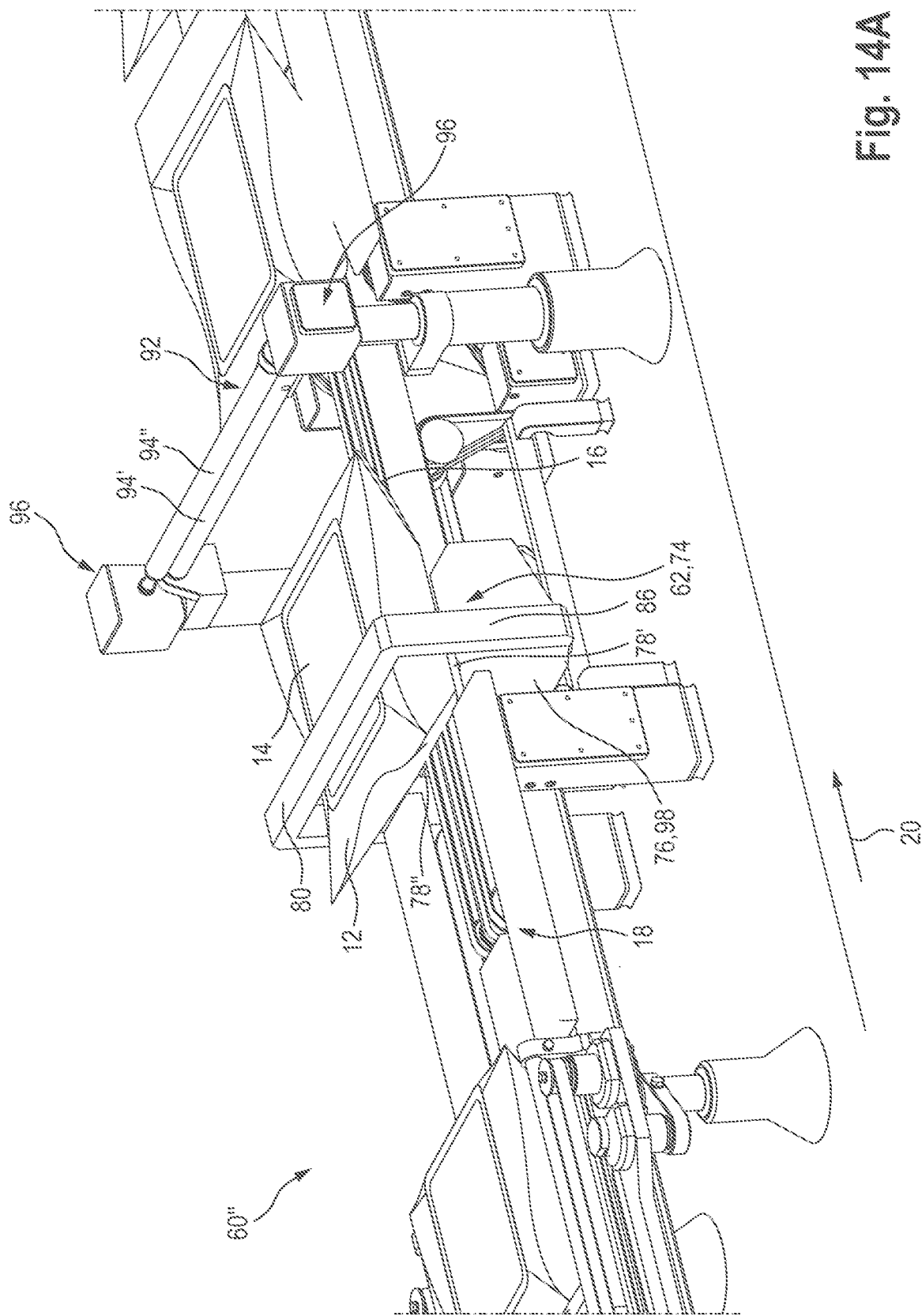

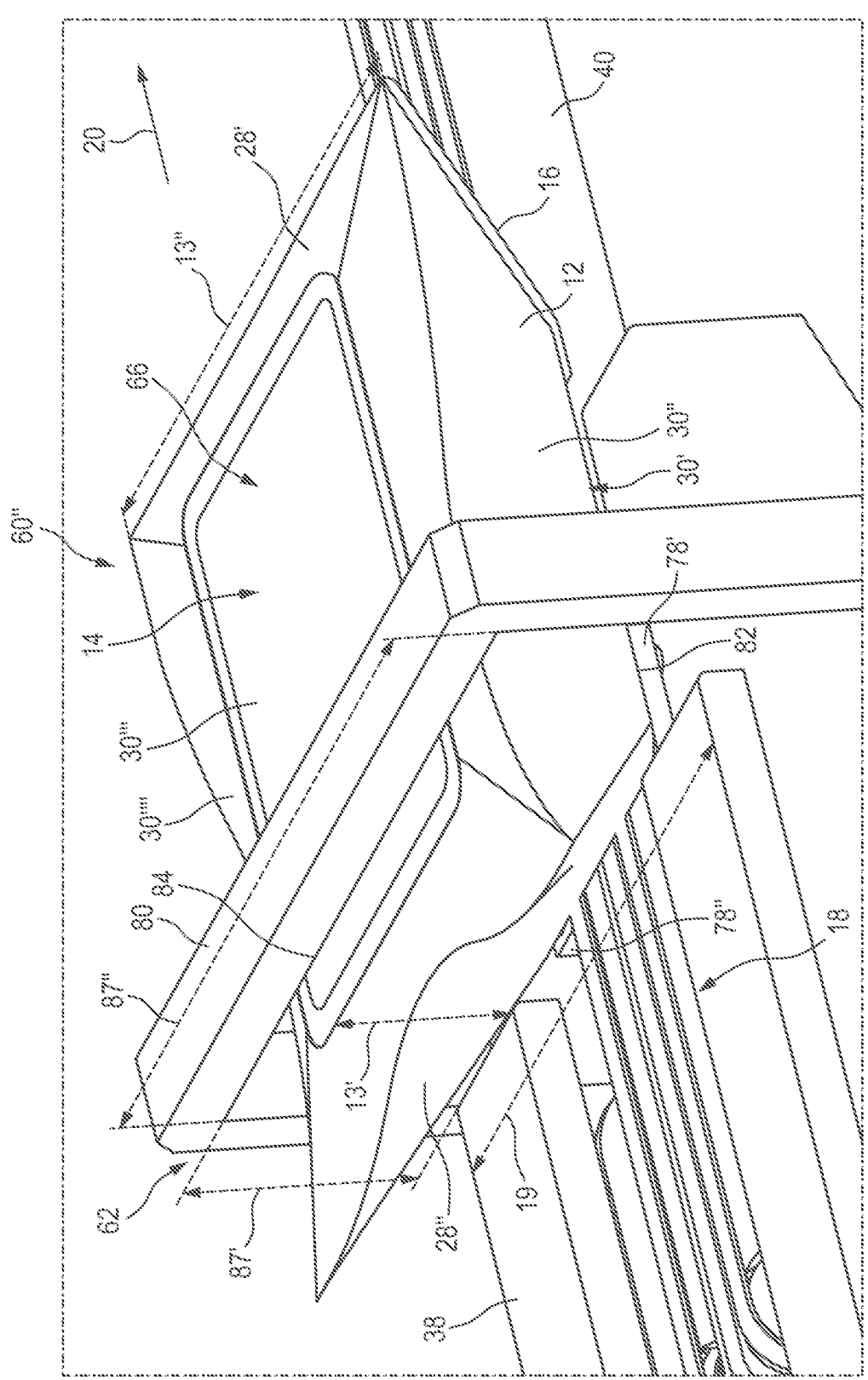

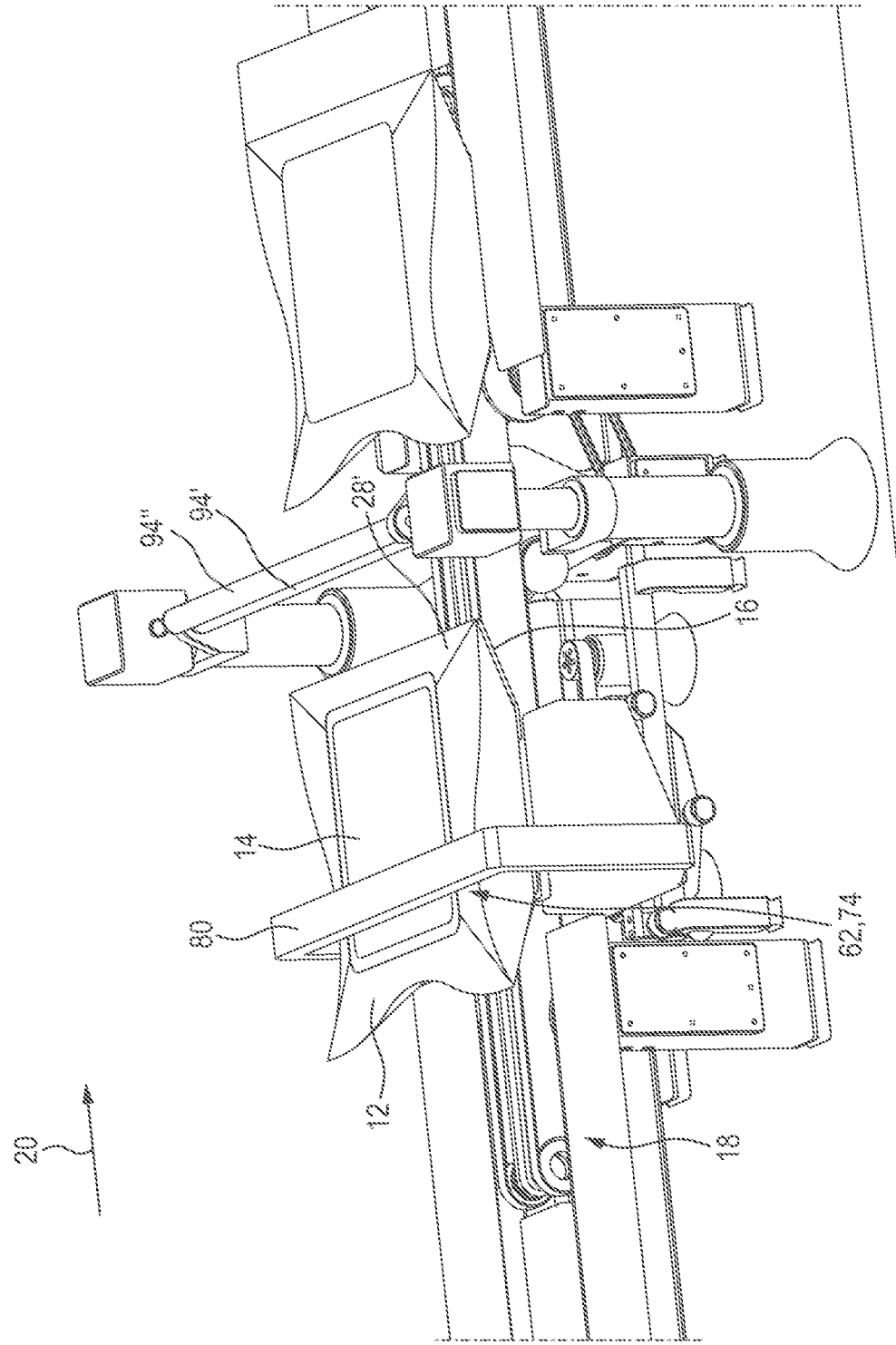

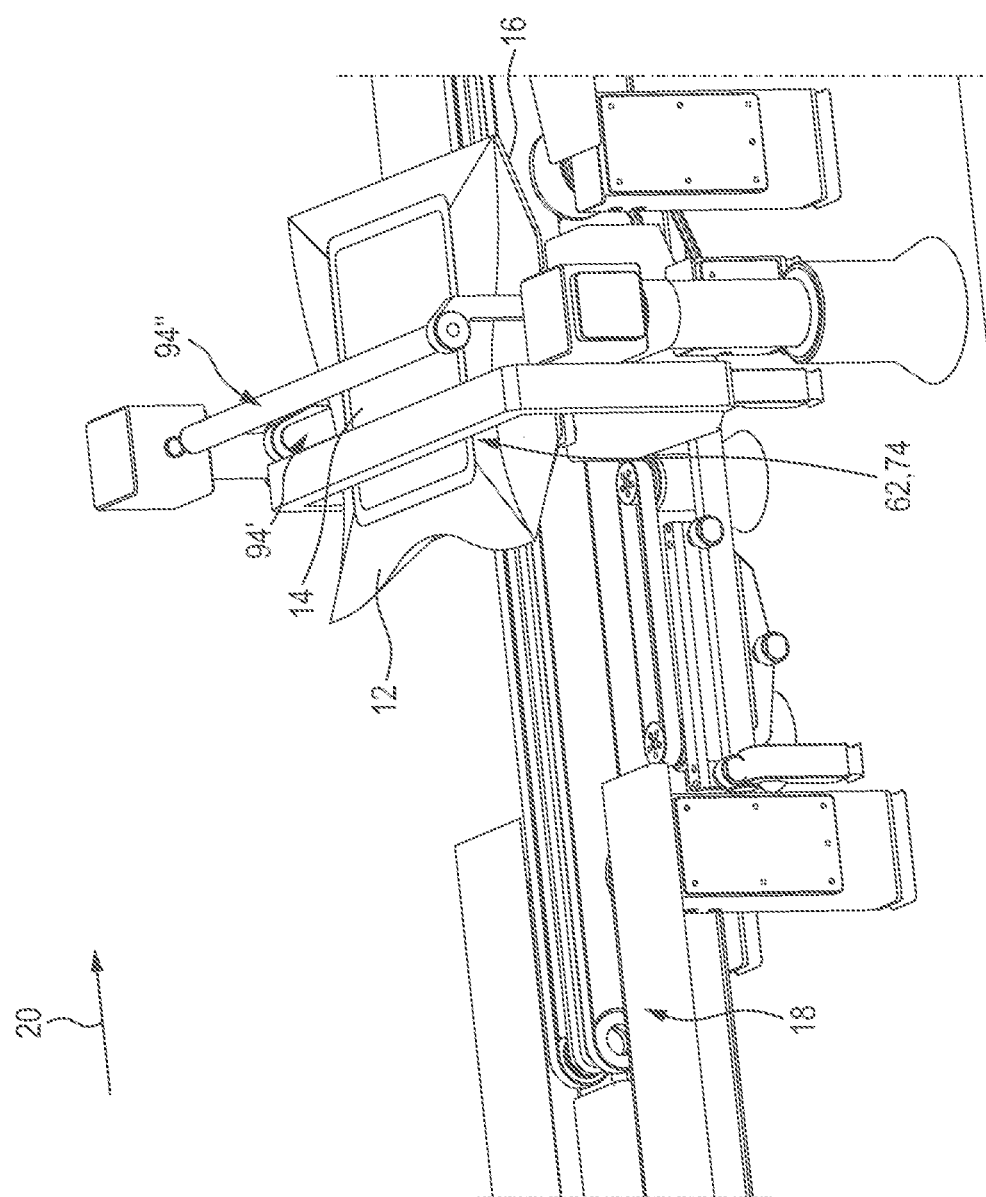

UNPACKING SYSTEM FOR AN OBJECT, IN PARTICULAR A PHARMACEUTICAL OR COSMETIC OBJECT, PACKED IN AN ITEM OF PACKAGING, IN PARTICULAR A POUCH

CROSS-REFERENCE TO RELATED APPLICATIONS

This application is a divisional of U.S. patent application Ser. No. 16/151,592, filed Oct. 4, 2018, and claims the priority of German patent application DE 10 2017 123 298.2, filed Oct. 6, 2017, and the priority of German patent application DE 10 2017 123 387.3, filed Oct. 9, 2017, wherein the content of each application is herewith incorporated by reference.

BACKGROUND OF THE INVENTION

The present application relates to a stretching device for stretching an item of packaging, in particular a pouch, for an object, in particular a pharmaceutical or cosmetic object, wherein the item of packaging has a projecting packaging portion, wherein the stretching device has a transportation installation for transporting the object in a transportation direction, a holding installation for holding the projecting packaging portion, and a motion installation for moving the object. The present application furthermore relates to a folding-out device for folding outwards a packaging portion of an item of packaging, in particular a pouch, for an object, in particular a pharmaceutical or cosmetic object, wherein the packaging portion initially is folded inwards between a transportation installation and the item of packaging. The present application furthermore relates to an unpacking system which has a folding-out device and a stretching device. The present application furthermore relates to a filling system having an unpacking system. The present application furthermore relates to a method for stretching an item of packaging, in particular a pouch, for an object, in particular a pharmaceutical or cosmetic object. The present application furthermore relates to a method for folding outwards a packaging portion of an item of packaging, in particular a pouch, for an object, in particular a pharmaceutical or cosmetic object. The present application furthermore relates to a method for unpacking an object from an item of packaging.

Filling systems having unpacking systems for unpacking objects, in particular pharmaceutical and cosmetic objects, as well as device systems for stretching and severing a packaging portion, are known for example from documents WO 2011/012658 A1 and DE 10 2007 027 878 A1.

Depending on the installation situation of the unpacking system, it is however often the case in practice that only a limited installation space is available for the unpacking system.

It is therefore an object of the present application to provide an improved unpacking system for unpacking objects, in particular pharmaceutical or cosmetic objects, in particular for a filling system, and an improved method for unpacking. There is furthermore a demand for an improved stretching device for stretching a packaging portion of an item of packaging, in particular a pouch, for an object, in particular a pharmaceutical or cosmetic object, and for a method for stretching. There is furthermore a demand for a folding-out device for folding outwards a packaging portion of an item of packaging, in particular a pouch, for an object, in particular a pharmaceutical or cosmetic object, and for a method for folding outwards.

BRIEF SUMMARY OF THE INVENTION

According to a first aspect, a stretching device for stretching an item of packaging, in particular a pouch, for an object, in particular a pharmaceutical or cosmetic object, is therefore proposed, wherein the item of packaging has a projecting packaging portion. The stretching device has a transportation installation for transporting the object in a transportation direction, a holding installation for holding the projecting packaging portion, and a motion installation for moving the object. The holding installation has at least two rollers which are disposed so as to be perpendicular to the transportation direction and which are configured for holding the projecting packaging portion therebetween. The motion installation and/or the holding installation are/is configured so as to be movable parallel with the transportation direction in order for the object and the holding installation to be moved away from one another.

According to a second aspect, a method for stretching an item of packaging, in particular a pouch, for an object, in particular a pharmaceutical or cosmetic object, is proposed, wherein the item of packaging has a projecting packaging portion, wherein the object is transported in a transportation direction on a transportation installation. The method herein comprises the following method steps:
  holding the projecting packaging portion by a holding installation, wherein the holding installation has at least two rollers which are disposed so as to be perpendicular to the transportation direction, wherein the projecting packaging portion is held between the at least two rollers; and
  moving the object and/or the holding installation parallel with the transportation direction in order for the object and the holding installation to be moved away from one another.

The object is transported on the transportation installation. The transportation direction of the object corresponds to the moving direction of the object on the transportation installation. The terms "upstream" and "downstream" herein are to be understood in relation to the transportation direction.

The terms "longitudinal side" and "end side" are likewise to be understood in relation to the transportation direction. A "longitudinal side" herein is disposed so as to be substantially parallel with the transportation direction. By contrast, an end side is disposed so as to be substantially perpendicular to the transportation direction.

The spatial arrangement of elements hereunder is stated relative to the transportation installation and to the item of packaging that is transported on the transportation installation, or relative to the object that is transported on the transportation installation, respectively. The item of packaging has a longitudinal side that faces the transportation installation, and a longitudinal side that faces away from the transportation installation. The transportation installation likewise has a side that faces the item of packaging/the object, and a side that faces away from the item of packaging/the object. Accordingly, elements can be disposed on that side of the transportation installation that faces the item of packaging/the object, or on that side that faces away from the item of packaging/the object.

On account of the projecting packaging portion by means of a holding installation being held on an end side of the item of packaging, and the item of packaging being moved in a direction that points away from the holding installation, the item of packaging is stretched at the end side. Since the rollers are disposed so as to be perpendicular to the transportation direction, said rollers acquire a part of the packaging portion that is disposed on an end side of the item of packaging. On account thereof, the item of packaging is stretched parallel with the transportation direction and at the end side of the item of packaging.

On account of the stretching parallel with the transportation direction, significantly less space is required laterally to the transportation installation, since the stretching procedure is performed above the transportation installation. Only individual components of the motion installation or of the holding installation can be disposed laterally to the transportation installation. However, a majority of said components is preferably disposed on that side of the transportation installation that faces away from the object or faces the latter.

On account of the stretching parallel with the transportation direction, the following devices of an unpacking system such as, for example, a severing device for severing the stretched packaging portion and a retrieving device for retrieving the object from the item of packaging can furthermore likewise be disposed in the transportation direction without any additional repositioning of the packed object being required.

According to a third aspect, a folding-out device for folding outwards a packaging portion of an item of packaging, in particular a pouch, for an object, in particular a pharmaceutical or cosmetic object, is proposed. The folding-out device has a transportation installation for transporting the object in a transportation direction, a lifting installation for raising the object, a holding installation for holding a region of the item of packaging that is adjacent to the packaging portion, and a holding-installation drive installation for moving the holding installation in a direction that points away from the packaging portion.

According to a fourth aspect, a method for folding outwards a packaging portion of an item of packaging, in particular a pouch, for an object, in particular a pharmaceutical or cosmetic object, is proposed, wherein the object on a transportation installation is transported in a transportation direction. The method herein comprises the following method steps:

raising the object by a lifting installation;
holding a region of the item of packaging that is adjacent to the packaging portion by a holding installation; and
moving the holding installation in a direction that points away from the packaging portion.

The packaging portion on one side is connected to the item of packaging at a connection point and, proceeding from the connection point, extends along the item of packaging up to a region on the longitudinal side of the item of packaging that faces or faces away from the transportation installation. The region that is adjacent to the packaging portion is to be understood as such a region of the item of packaging that is contiguous to the connection point between the packaging portion and the item of packaging, and extends away from the packaging portion.

For example, the packaging portion initially can be partially disposed between the longitudinal side that faces the transportation installation and that side of the transportation installation that faces the item of packaging, and on account thereof is folded inwards between the transportation installation and the item of packaging. The connection point herein can be disposed on an end side of the item of packaging. The packaging portion in this instance can extend from the connection point towards the transportation installation up to between the transportation installation and the longitudinal side of the item of packaging that faces the transportation installation. In this case, one region of the end side that is on that side of the connection point that points away from the transportation installation, and one region of the longitudinal side that faces away from the transportation installation correspond to a region of the item of packaging that is adjacent to the packaging portion. Furthermore, the connection point can also be disposed on the edge between an end side and that longitudinal side that faces the transportation installation. In this case, the end side corresponds to a region that is adjacent to the packaging portion. Furthermore, the connection point can also be disposed on the edge between an end side and the longitudinal side that faces away from the transportation installation. In this case, the longitudinal side that faces away from the transportation installation corresponds to a region that is adjacent to the packaging portion. Furthermore, the connection point can also be disposed on the longitudinal side that faces away from the transportation installation, or on the longitudinal side that faces the transportation installation. The respective adjacent region in this instance corresponds to the region of the item of packaging that extends from the connection point away from the packaging portion.

If the region that is adjacent to the packaging portion is now moved or drawn away from the packaging portion, in particular away from the connection point between the packaging portion and the item of packaging, a tensile force is exerted by way of the connection point on the packaging portion. On account of said tensile force, the packaging portion is drawn out of the folded-in position thereof between the longitudinal side of the item of packaging that faces the transportation installation and the transportation installation and is thus folded outwards. The adjacent region herein can be drawn so far until the packaging portion has been completely folded outwards and is disposed in a desired position. The packaging portion in the desired position extends preferably parallel with the transportation installation, in particular parallel with the transportation direction, and away from the item of packaging, in particular away from the connection point.

In one alternative embodiment the packaging portion initially is partially folded inwards onto the longitudinal side of the item of packaging that faces away from the transportation installation. The connection point herein can be disposed on an end side of the item of packaging. The packaging portion in this instance can extend from the connection point away from the transportation installation up to the longitudinal side of the item of packaging that faces away from the transportation installation. Accordingly, the adjacent region is disposed on that side of the connection point that faces the transportation installation. The folded-in packaging portion can thus likewise be folded outwards by drawing the adjacent region away from the connection point.

On account of the packaging portion being folded outwards, subsequent steps in the unpacking method, or the handling of the item of packaging on downstream devices for stretching and/or severing the packaging portion, respectively, are significantly simplified. For example, a stretching device can more readily acquire and stretch the packaging portion.

According to a fifth aspect, a folding-out device for folding outwards a packaging portion of an item of packaging, in particular a pouch, for an object, in particular a pharmaceutical or cosmetic object, is proposed. The folding-out device has a transportation installation for transporting the object in a transportation direction, a lifting installation for raising the object, and a detent installation. The detent installation has at least one roller which is disposed so as to be perpendicular to the transportation direction and which is disposed on that side of the item of packaging that faces away from or faces the transportation installation and forms a detent for the folded-in packaging portion. The lifting installation and/or the detent installation are parallel configured so as to be movable/is with the transportation direction in order for the object and the detent installation to be moved relative to one another.

According to a sixth aspect, a method for folding outwards a packaging portion of an item of packaging, in particular a pouch, for an object, in particular a pharmaceutical or cosmetic object, is proposed, wherein the object on a transportation installation is transported in a transportation direction. The method herein comprises the following method steps:

raising the object by a lifting installation;
first moving of the lifting installation relative to a detent installation parallel with the transportation direction in such a manner that the item of packaging at least in portions is disposed on the detent installation;
bringing to bear a roller of the detent installation on a longitudinal side of the item of packaging in order for a detent for the packaging portion to be formed; and
second moving of the lifting installation relative to the detent installation parallel with the transportation direction in such a manner that the folded-in packaging portion is folded outwards.

On account of the packaging portion being folded outwards, subsequent steps in the unpacking method, or the handling of the item of packaging on downstream devices for stretching and/or severing the packaging portion, respectively, are significantly simplified. For example, a stretching device can more readily acquire and stretch the packaging portion.

According to a seventh aspect, an unpacking system having a stretching device according to the first aspect or one of the design embodiments thereof, and having a folding-out device according to the third or fifth aspect or one of the design embodiments thereof, is proposed.

According to an eighth aspect, a method for unpacking an object, in particular a pharmaceutical or cosmetic object, from an item of packaging, in particular a pouch, is proposed, wherein the object on a transportation installation is transported in a transportation direction, wherein a packaging portion of the item of packaging initially is folded inwards between the transportation installation and the item of packaging. The method here in comprises the following method steps:

folding outwards the packaging portion by means of the method according to the fourth or the sixth aspect or one of the design embodiments thereof;
stretching the projecting packaging portion by means of the method according to the second aspect or one of the design embodiments thereof;
completely severing the projecting packaging portion; and
retrieving the object from the item of packaging.

In the case of the unpacking system described, and in the case of the method for unpacking described, a packaging portion which initially is folded inwards is folded outwards and subsequently stretched. The individual components of the stretching device and of the folding-out device herein are disposed in a compact and space-saving manner. On account of the packaging portion being stretched parallel with the transportation direction, a compact arrangement of the subsequent handling devices such as, for example, a severing device and/or a retrieving installation is enabled.

According to a ninth aspect, an unpacking system for unpacking an item of packaging, in particular a pouch, for an object, in particular a pharmaceutical or cosmetic object, is proposed, wherein the item of packaging has a projecting packaging portion which is disposed on an upstream end side of the item of packaging. The unpacking system has a transportation installation for transporting the object in a transportation direction, and a holding installation for holding the projecting packaging portion. The holding installation has at least two rollers which are disposed so as to be perpendicular to the transportation direction and which are configured for folding outwards and/or stretching the projecting packaging portion.

According to a tenth aspect, a method for unpacking an object, in particular a pharmaceutical or cosmetic object, from an item of packaging (12), in particular a pouch, wherein the object (14) on a transportation installation (18) is transported in a transportation direction (20), wherein the item of packaging (12) has a folded-in packaging portion (16) which is disposed on an upstream end side (28″) of the item of packaging (12) and extends on a longitudinal side (30′, 30′″) that faces of faces away from the transportation installation (18). The method (200) herein comprises the following method steps:

bringing to bear two rollers which are disposed so as to be perpendicular to the transportation direction and so as to be mutually parallel on a longitudinal side of the item of packaging that faces the transportation installation, and on a longitudinal side of the item of packaging that faces away from the transportation installation, in order for a detent for the projecting packaging portion to be formed in such a manner that the projecting packaging portion is folded outwards;
holding the projecting packaging portion between the two rollers in order for the projecting packaging portion to be stretched;
severing the projecting packaging portion; and
retrieving the object from the item of packaging.

In the case of such an unpacking system and method for unpacking, no lifting installation or motion installation is required. Instead, the packed objects are moved further along on the transportation installation, in particular at a consistent speed. This unpacking system and the method for unpacking thus represent a particularly space-saving solution, since significantly fewer components are required.

In the case of this method it is however mandatory that the projecting packaging portion is disposed on an upstream end side of the item of packaging.

According to an eleventh aspect, a filling system having an unpacking system according to the seventh and the ninth aspect or one of the design embodiments thereof is proposed.

The packed objects have to be unpacked prior to further processing, for example filling or refilling in a filling station. The unpacking system described provides a simple and compact solution therefor, which also is implementable in a tight installation space.

In one refinement of the stretching device it can be provided that the projecting packaging portion in relation to the transportation direction is disposed on one of the end sides of the item of packaging, in particular wherein the packaging portion in relation to the transportation direction is disposed on a downstream end side.

On account of the disposal of the projecting packaging portion on the end sides, it can be avoided that the projecting packaging portion protrudes laterally beyond the width of the transportation installation. It is avoided in particular on account thereof that the projecting packaging portion catches on construction components or objects which are disposed laterally to the transportation installation.

In one further refinement of the stretching device it can be provided that the projecting packaging portion projects from the item of packaging so as to be substantially parallel with the transportation direction.

On account thereof, the retrieval of the projecting packaging portion between the lateral rollers of the holding installation is facilitated.

In one further refinement of the stretching device it can be provided that the motion installation is configured such that the latter holds the item of packaging on at least one longitudinal side.

To this end, the object can, for example, be in contact with the longitudinal side thereof that faces, with the motion installation, the transportation installation, and in particular can be disposed on the motion installation. In the case of a sufficiently high weight of the object, the static friction is sufficient in order for the object conjointly with the item of packaging for stretching to be moved away from the holding installation which holds the packaging portion, without the item of packaging overcoming the static friction and the tensile force exerted being reduced, for example by slippage on the motion installation, or being completely stopped, for example when the object leaves the motion installation, in particular when the object drops from the motion installation. Furthermore, the motion installation can hold the object on two or more sides, for example by means of a clamping force, which is exerted on two opposite longitudinal sides. The clamping force is herein to be chosen sufficiently high in order to stretch the item of packaging.

In one further refinement of the stretching device it can be provided that the motion installation is disposed on that side of the transportation installation that faces away from the item of packaging.

On account of disposal on that side of the transportation installation that faces away from the item of packaging, the space requirement of the stretching device laterally to the transportation installation is reduced.

In one further refinement of the stretching device it can be provided that the motion installation has at least one clamping installation or suction installation for holding the item of packaging.

The item of packaging is fixed to the motion installation on account of the clamping installation or the suction installation. Forces which are directed so as to be substantially parallel with the transportation direction act during the stretching of the item of packaging. The clamping installation or the suction installation is in particular provided in order for the object to remain fixed in terms of the position thereof on the motion installation and cannot slip on account of a tensile force which arises in the stretching procedure and which is counter to the movement direction of the motion installation.

Alternatively, it can also be provided that the item of packaging is held on the motion installation in a purely mechanical manner by friction, that is to say in particular by virtue of the weight of the object which pushes the item of packaging onto the transportation installation.

In one further refinement of the stretching device it can be provided that the at least two rollers are disposed so as to be mutually parallel.

The projecting packaging portion for stretching is to be disposed between the two rollers. If the two rollers are disposed so as to be parallel, placing the projecting packaging portion between the two rollers is simplified.

In one further refinement of the stretching device it can be provided that the at least two rollers are disposed downstream of the motion installation, wherein the motion installation is configured for moving the object counter to the transportation direction and away from the holding installation.

The objects typically are transported in the packed as well as the unpacked state in a transportation direction on a transportation installation. It is therefore advantageous for the objects to be retrieved from the item of packaging in the transportation direction. If the projecting packaging portion is now stretched in the transportation direction, in particular wherein the packaging portion is disposed on a downstream end side of the item of packaging, the subsequent operational steps such as opening the item of packaging are facilitated since, on account thereof, the item of packaging can be opened on the downstream end side without the item of packaging and the object having to be rotated on the transportation installation.

In one further refinement of the stretching device it can be provided that the at least two rollers are rotatably mounted.

The projecting packaging portion for stretching is disposed between the at least two rollers in order for the at least two rollers to be able to hold the projecting packaging portion. For disposal, the projecting packaging portion is moved between the at least two rollers. If the at least two rollers now are rotatably mounted, the rollers in the disposing action can conjointly rotate in the movement direction of the projecting packaging portion in order for the disposal of the projecting packaging portion between the rollers to be facilitated.

In one further refinement of the stretching device it can be provided that the at least two rollers are configured for drawing in therebetween the projecting packaging portion.

If the projecting packaging portion comes into contact with the rollers, the rollers in this instance are movable in such a manner that said rollers therebetween convey the packaging portion to the correct position. On account thereof, the disposal of the projecting packaging portion between the rollers is in particular furthermore simplified.

In one further refinement of the stretching device it can be provided that the holding installation has a rotary roller drive installation for rotating the at least two rollers.

The rotary roller driving installation can drive the rollers in such a manner that said rollers therebetween draw in the projecting packaging portion. On account thereof, the disposal of the projecting packaging portion between the rollers is in particular further simplified.

In one further refinement of the stretching device it can be provided that the rotary roller drive installation is configured for rotating the at least two rollers in mutually opposite running directions.

On account of the rollers being rotated in opposite directions, the drawing-in of the projecting packaging portion between the rollers is simplified. The holding installation preferably has exactly two rollers, wherein the exactly two rollers are driven in opposite running directions by the rotary roller drive installation.

In one further refinement of the stretching device it can be provided that the at least two rollers are movable relative to one another, in particular wherein the two rollers are configured for jamming therebetween the projecting packaging portion.

On account of the mutually relative movement the spacing between the rollers is capable of being set in a variable manner. It is advantageous herein for the relative mutual spacing of the rollers to be large when the projecting packaging portion is being introduced between the rollers. As soon as the projecting packaging portion is disposed between the rollers, the relative mutual spacing of the rollers can be decreased in such a manner that the projecting packaging portion is jammed between the rollers.

In one further refinement of the stretching device it can be provided that the holding installation has a translatory roller drive installation for moving the at least two rollers.

The translatory roller drive installation moves the rollers in particular in a mutually relative manner. The translatory roller drive installation can thus set the relative mutual spacing of the rollers in an arbitrary manner.

In one further refinement of the folding-out device according to the third aspect it can be provided that the holding installation is configured such that the latter holds the item of packaging on a longitudinal side that faces away from the transportation installation.

The packaging portion initially is folded inwards between the transportation installation and a longitudinal side of the item of packaging that faces the transportation installation. If the holding installation now engages the item of packaging on the longitudinal side that faces away from the transportation direction and draws the item of packaging in a direction that points away from the packaging portion, the packaging portion is thus folded outwards in a simple manner. The packaging portion herein is preferably connected to the remainder of the item of packaging on a downstream end side of the item of packaging. On account thereof, the packaging portion in a folded-out state projects from the downstream end side of the item of packaging. The holding installation preferably holds the item of packaging in a downstream region of the longitudinal side of the item of packaging that faces away from the transportation installation. For folding outwards, the holding installation in this instance is moved to an upstream region of the longitudinal side that faces away from the transportation direction.

In one further refinement of the folding-out device according to the third aspect it can be provided that the holding installation is disposed on that side of the transportation installation that faces the object.

On account of the holding installation being disposed on that side of the transportation installation that faces the object, the space requirement of the folding-out device laterally to the transportation installation is reduced.

In one further refinement of the folding-out device according to the third aspect it can be provided that the holding installation has at least one clamping installation or suction installation for holding the item of packaging.

On account of a clamping installation or suction installation, holding the item of packaging on an adjacent region can be implemented in a simple manner. The holding installation herein preferably has a suction installation.

In one further refinement of the folding-out device according to the third aspect it can be provided that the holding installation is movable parallel with the transportation direction, in particular in order for the packaging portion to be folded outwards, in particular wherein the holding-installation drive installation 68 is configured for moving the holding installation parallel with the transportation direction 20 and in particular counter thereto.

If the packaging portion is disposed on one of the end sides of the item of packaging and proceeding from the connecting point on the end side is folded inwards between the transportation installation and the longitudinal side that faces the transportation installation, a tensile force in or counter to the transportation direction, that is to say parallel with the transportation direction, that engages on the longitudinal side that faces away from the transportation installation is required in order for the packaging portion to be folded outwards.

In one further refinement of the folding-out device according to the third and the fifth aspect it can be provided that the lifting installation is disposed on that side of the transportation installation that faces away from the item of packaging.

On account thereof, the lifting installation has to be designed only such that said lifting installation engages the object including the item of packaging on the longitudinal side that faces the transportation installation and lifts said object including the item of packaging. Clamping, gripping, or holding the item of packaging and the object can be advantageous herein but is not mandatory when the static friction between the item of packaging and the lifting installation is sufficiently high. Furthermore, in the case of such a disposal of the lifting installation on that side of the transportation installation that faces away from the item of packaging, the space requirement laterally to the transportation installation is reduced.

In one further refinement of the folding-out device according to the third and the fifth aspect it can be provided that a transportation plane of the transportation installation has at least one clearance, wherein the lifting installation is configured for engaging through the clearance in order for the object to be raised.

On account thereof, the manner in which a lifting installation which is disposed on that side of the transportation installation that faces away from the item of packaging can engage on the item of packaging and the object on the longitudinal side that faces the transportation installation is implemented in a simple and compact manner.

In one further refinement of the folding-out device according to the third and the fifth aspect it can be provided that the lifting installation is configured for raising the transportation installation, in particular a transportation plane of the transportation installation, at least in the bearing region of the item of packaging on the transportation plane, in order for the object to be raised.

On account thereof, it is implemented in a simple manner how the object can be raised by the lifting installation.

In one further refinement of the folding-out device according to the third and the fifth aspect it can be provided that the lifting installation is configured such that the latter holds the item of packaging on at least one longitudinal side.

Since the holding installation holds the item of packaging in the folding-out procedure and herein is moved in a direction that points away from the packaging portion, it can be advantageous for the lifting installation to hold the item of packaging in order for the object not to move on the lifting installation when being folded outwards.

In one further refinement of the folding-out device according to the third and the fifth aspect it can be provided that the lifting installation has at least one clamping installation or one suction installation for holding the item of packaging.

On account of the clamping installation or the suction installation, the item of packaging is fixed to the lifting installation. Forces which are directed so as to be substantially parallel with the transportation direction act while the item of packaging is folded outwards. The clamping installation or the suction installation are in particular provided so that the object remains fixed in the position thereof on the lifting installation and cannot slip in the movement direction of the holding installation on account of tensile forces that arise in the folding-out procedure.

In one further refinement of the folding-out device according to the fifth aspect it can be provided that the detent installation has exactly two rollers, wherein a first roller of the two rollers is disposed on the longitudinal side of the item of packaging that faces the transportation installation, and a second roller of the two rollers is disposed on the longitudinal side of the item of packaging that faces away from the transportation installation.

In unpacking systems it can readily happen that in the unpacking of a plurality of objects in succession, the projecting packaging portion, depending on the object, is folded inwards either on that side of the item of packaging that faces the transportation installation or on that side of the item of packaging that faces away from the transportation installation. On account of disposing in each case one roller on that side of the item of packaging that faces the transportation installation and on that side of the item of packaging that faces away from the transportation installation, it is ensured that always one roller can form a detent for the projecting and folded-in packaging portion.

In one further refinement of the folding-out device according to the fifth aspect it can be provided that the rollers are movable relative to one another.

It is achieved on account thereof that the two rollers initially can be spaced apart such that the item of packaging can be guided through between the rollers. Thereafter, the rollers can be brought to bear on the item of packaging and roll on the contour in the longitudinal direction of the item of packaging, so as on account thereof to completely fold outwards the folded-in packaging portion and to align the latter in the longitudinal direction.

In one further refinement of the folding-out device according to the fifth aspect it can be provided that the lifting installation has a horizontal drive which is configured for moving the lifting installation parallel with the transportation direction, in particular counter to the transportation direction.

On account of the movement of the lifting installation parallel with the transportation direction, the object and the item of packaging are moved parallel with the transportation direction. If the folded-in packaging portion bears on the roller, said folded-in packaging portion is folded outwards on account of a movement of this type.

The objects typically are transported in the packed as well as the unpacked state in a transportation direction on a transportation installation. It is therefore advantageous for the objects to be able to be retrieved from the item of packaging in the transportation direction. It is therefore advantageous for the packaging portion to be disposed on a downstream end side, to be folded outwards on account of a movement of the lifting installation counter to the transportation direction, and thus project in a downstream manner. On account thereof, opening the item of packaging is enabled on a downstream end of the item of packaging.

In one further refinement of the unpacking system according to the seventh and the ninth aspect it can be provided that the transportation installation is configured for transporting the object from the folding-out device to the stretching device.

The folding-out device and the stretching device typically are disposed in succession in a downstream manner, but herein do not have to be directly successive. The two devices herein can thus also be disposed so as to be locationally spaced apart from one another. It can therefore be advantageous for the transportation installation to transport the items of packaging having a folded-out packaging portion to the stretching device.

In one further refinement of the unpacking system according to the seventh and the ninth aspect it can be provided that the unpacking system has first support holders which are movable perpendicularly to and parallel with the transportation direction and which configure the lifting installation and the motion installation.

By virtue of the spatial restrictions for the unpacking system, and in order for the transportation path between individual devices of the unpacking system to be minimized, it can be advantageous for the folding-out device and the stretching device to be disposed so as to be as close to one another as possible, in particular wherein the two devices are disposed at the same location. It can therefore be advantageous for a movable support holder to configure the lifting installation of the folding-out device as well as the motion installation of the stretching device. It is thus possible for the folding-out device and the stretching device to be disposed so as to be as close to one another as possible.

In one further refinement of the unpacking system according to the ninth aspect it can be provided that the unpacking system has second support holders which are movable perpendicularly to and parallel with the transportation direction and which configure the holding installation and the detent installation.

It is enabled on account thereof that the rollers of the detent installation and the rollers of the holding installation are identical. This is advantageous in particular when the folding-out device and the stretching device are to be disposed as close as possible to one another. On account thereof, it is in particular possible for the operational steps of folding outwards and of stretching to be carried out in direct succession. The rollers to this end can be brought to bear on the two sides of the item of packaging, wherein one of the two rollers forms a detent for the folded-in packaging portion. The packaging portion can be folded outwards on account of a relative movement between the support holder and the object. The rollers in this instance can hold the projecting packaging portion and stretch the latter on account of a further relative movement, or on account of being drawn in between the rollers.

In one further refinement of the unpacking system according to the seventh and the ninth aspect, it can be provided that the transportation installation ahead of the folding-out device has a first deflection portion which causes a first directional change of the transportation direction, in particular wherein the first directional change is 90°.

By virtue of spatial restrictions in industrial sheds and of the restricted space for devices which can be disposed along a transportation installation, it may be impossible for the transportation installation to be able to run in a straight line. The transportation installation therefore preferably has deflection portions which cause a directional change of the transportation direction. The directional changes herein can assume any arbitrary value. In order for an ideally mutually symmetrical arrangement of all components to be achieved, it is advantageous for the directional change to be substantially 90°.

In one further refinement of the unpacking system according to the seventh and the ninth aspect it can be provided that the unpacking system furthermore has a severing device for completely severing the projecting and stretched packaging portion from the item of packaging.

The severing device is disposed downstream of the stretching device. On account of the packaging portion protruding and being stretched, on account of which the packaging portion in particular projects far from the item of packaging, the severing of the packaging portion by a severing device is facilitated. The severing device herein can have a holding installation for holding the projecting and stretched packaging portion, in order for the packaging portion to be fixedly held during the severing. However, said holding installation is not mandatory since the packaging portion on account of the stretching process projects far from the item of packaging. The severing device can preferably be disposed so as to be perpendicular to the transportation direction.

In one further refinement of the unpacking system according to the seventh and the ninth aspect, it can be provided that the severing device has a cutter, a laser, or a thermal separation method for completely severing the packaging portion.

Holding the packaging portion in a separate manner is not required in particular in the case of a laser or of a thermal separation method. A separate holding installation can in this instance be of advantage when the severed packaging portion is discarded in a targeted manner by means of the holding installation.

In one further refinement of the unpacking system according to the seventh and the ninth aspect it can be provided that the severing device has a retrieving installation for retrieving the object from the item of packaging.

The retrieving installation herein can have holding means, for example a clamping installation, for holding the item of packaging, in particular on a side that is opposite the open side of the item of packaging. The retrieving installation can furthermore have a gripping installation for removing the object from the item of packaging. Alternatively, the item of packaging can be drawn away from the object by means of a gripping installation, in order for the item of packaging to be removed from the object.

In one further refinement of the unpacking system according to the seventh and the ninth aspect it can be provided that the severing device has a discarding installation which is configured for discarding the severed packaging portion and the remainder of the item of packaging.

The discarding device herein can have one or a plurality of grippers which moves/move the packaging parts away from the severing device. The discarding installation can also have a conveyor belt or another transportation installation which conveys the remainders of packaging away from the severing device. To this end, grippers can be configured herein for placing the remainders of packaging onto the conveyor belt. Alternatively, the discarding installation could also be configured by means of a suction installation which suctions the remainders of packaging and thus transports the latter away from the severing device.

In one further refinement of the unpacking system according to the seventh and the ninth aspect it can be provided that the transportation installation is configured for transporting the object from the stretching device to the severing device, in particular wherein the transportation installation between the stretching device and the severing device has a second deflection portion which causes a second directional change of the transportation direction, in particular wherein the second directional change is 90°.

By virtue of the spatial arrangement of the device it can be advantageous for the stretching device and the severing device to be placed so as to be mutually separate in spatial terms. On account thereof, it becomes necessary for the objects including the item of packaging to be moved from the stretching device to the severing device. The transportation installation which can run between the stretching device and the severing device offers one possibility for transporting the object from the stretching device to the severing device. In one advantageous refinement, the severing device and the stretching device in relation to the transportation direction can be disposed at a mutual angle. This is of importance in particular when the available space, for instance in an industrial shed in which the packaging system is disposed, is limited. In this case it is advantageous for the transportation installation to have a deflection portion in which the transportation direction is changed.

In one further refinement of the unpacking system according to the seventh and the ninth aspect it can be provided that the transportation installation is configured for transporting the object away from the severing device, in particular wherein the transportation installation upstream of, in, or downstream of the severing device has a third deflection portion which causes a third directional change of the transportation direction, in particular wherein the third directional change is 90°.

A continuous transportation installation which transports the object to all devices and away from all devices is thus provided. By virtue of spatial restrictions in industrial sheds and of the restricted space for devices which may be disposed along a transportation installation, it may be impossible for the transportation installation to run in a straight line. The transportation installation therefore preferably has the third deflection portion which causes a directional change of the transportation direction. The directional change herein can assume any arbitrary value. In order for an ideally mutually symmetrical arrangement of all components to be achieved it is advantageous for the directional change to be substantially 90°.

In one further refinement of the unpacking system according to the seventh and the ninth aspect it can be provided that the transportation installation is configured for transporting the unpacked objects from the severing device into a cleanroom.

In particular in the pharmaceutical and cosmetic sector in which unpacking systems are used, deliveries of such packed objects arrive in a non-sterile region. Unpacking is then carried out in the non-sterile region. It is therefore advantageous for the severing device to be disposed so as to be as close as possible to a cleanroom. It is therefore advantageous for the transportation installation downstream of the severing device to run directly into a cleanroom without the objects having to be transferred to another transportation installation, transported to another operational step onto another device in the non-sterile region, or transported across a vast distance.

In one further refinement of the method for stretching it can be provided that in the step of moving a motion installation holds the item of packaging on at least one longitudinal side.

To this end, the object can, for example, be in contact with the longitudinal side thereof that faces, with the motion installation, the transportation installation, and in particular can be disposed on the motion installation. In the case of a sufficiently high weight of the object, the static friction is sufficient in order for the object conjointly with the item of packaging for stretching to be moved away from the holding installation which holds the packaging portion, without the item of packaging overcoming the static friction and the tensile force exerted being reduced, for example by slippage on the motion installation, or being completely stopped, for example when the object leaves the motion installation, in particular when the object drops from the motion installation. Furthermore, the motion installation can hold the object on two or more sides, for example by means of a clamping force, which is exerted on two opposite longitudinal sides. The clamping force is herein to be chosen sufficiently high in order to stretch the item of packaging.

In one further refinement of the method for stretching it can be provided that the projecting packaging portion in relation to the transportation direction is disposed on the downstream end side, wherein in the step of moving the object is moved counter to the transportation direction and away from the holding installation.

The objects typically are transported in the packed as well as the unpacked state in a transportation direction on the transportation installation. It is therefore advantageous for the objects to be able to be retrieved from the item of packaging in the transportation direction. If the projecting packaging portion is now stretched in the transportation direction, in particular wherein the packaging portion is disposed on a downstream end side of the item of packaging, the subsequent operational steps such as opening the item of packaging are facilitated since, on account thereof, the item of packaging can be opened on the downstream end side without the item of packaging and the object having to be rotated on the transportation installation.

In one further refinement of the method for stretching it can be provided that in the step of holding the at least two rollers therebetween draw in the projecting packaging portion.

If the projecting packaging portion comes into contact with the rollers, the rollers are moved in such a manner that the latter therebetween convey the packaging portion to the correct position. On account thereof, the disposal of the projecting packaging portion between the rollers is in particular further simplified.

In one further refinement of the method for stretching it can be provided that in the step of holding the at least two rollers are rotated in mutually opposite directions, on account of which the projecting packaging portion is drawn in between the at least two rollers.

The drawing-in of the projecting packaging portion between the rollers is simplified on account of the counter-rotation of the rollers. The holding installation preferably has exactly two rollers, wherein the exactly two rollers are driven in opposite running directions.

In one further refinement of the method for stretching it can be provided that in the step of holding the at least two rollers are moved relative to one another, on account of which the at least two rollers therebetween jam the projecting packaging portion.

The spacing between the rollers becomes capable of being set in a variable manner on account of the mutually relative movement. It is advantageous herein for the relative mutual spacing of the rollers to be large when the projecting packaging portion is introduced between the rollers. As soon as the projecting packaging portion is disposed between the rollers, the relative mutual spacing of the rollers can be decreased in such a manner that the projecting packaging portion is jammed between the rollers.

In one further refinement of the method for folding outwards according to the fourth aspect it can be provided that in the step of holding the holding installation holds the item of packaging on a longitudinal side that faces away from the transportation installation.

The packaging portion initially is folded inwards between the transportation installation and a longitudinal side of the item of packaging that faces the transportation installation. If the holding installation now engages the item of packaging on the longitudinal side that faces away from the transportation installation and draws the item of packaging in a direction that points away from the packaging portion, the packaging portion is thus folded outwards in a simple manner. The packaging portion herein is preferably connected to the remainder of the item of packaging on a downstream end side of the item of packaging. On account thereof, the packaging portion in a folded-out state projects from the downstream end side of the item of packaging. The holding installation preferably holds the item of packaging in a downstream region of the longitudinal side of the item of packaging that faces away from the transportation installation. For folding outwards, the holding installation in this instance is moved to an upstream region of the longitudinal side that faces away from the transportation installation.

In one further refinement of the method for folding outwards according to the fourth aspect it can be provided that in the step of moving the holding installation is moved parallel with the transportation direction and in particular counter thereto, on account of which the packaging portion is folded outwards.

If the packaging portion is disposed on one of the end sides of the item of packaging and proceeding from the connecting point on the end side is folded inwards between the transportation installation and the longitudinal side that faces the transportation installation, a tensile force in or counter to the transportation direction, that is to say parallel with the transportation direction, is advantageous in order for the packaging portion to be folded outwards.

In one further refinement of the method for folding outwards according to the fourth and the sixth aspect it can be provided that in the step of raising the lifting installation holds the item of packaging on at least one longitudinal side.

Since the holding installation holds the item of packaging in the folding-out procedure and herein is moved in a direction that points away from the packaging portion, it can be advantageous for the lifting installation to hold the item of packaging in order for the object not to move on the lifting installation when being folded outwards.

It is to be understood that the afore-mentioned features and those yet to be explained hereunder can be used not only in the combination stated in each case, but also in other combinations or individually, without departing from the scope of the present invention.

BRIEF DESCRIPTION OF THE SEVERAL VIEWS OF THE DRAWING

Embodiments of the invention are illustrated in the drawing and will be explained in more detail in the description hereunder. In the drawing:

FIG. 1A shows an isometric view of an embodiment of a stretching device;

FIG. 2 shows a lateral view of the stretching device in FIG. 1A;

FIG. 5B shows an isometric illustration of the step for holding in the method for stretching in FIG. 4;

FIG. 7 shows a lateral view of the folding-out device in FIG. 6A;

FIG. 14A shows an isometric illustration of a further folding-out device;

FIG. 14B shows an enlarged fragment of the view of the folding-out device in FIG. 14A;

FIG. 18A shows an isometric illustration of the step for raising in the method for folding outwards in FIG. 17;

FIG. 18B shows an isometric illustration of the step for holding in the method for folding outwards in FIG. 17.

DETAILED DESCRIPTION OF THE INVENTION

Figure 1B:
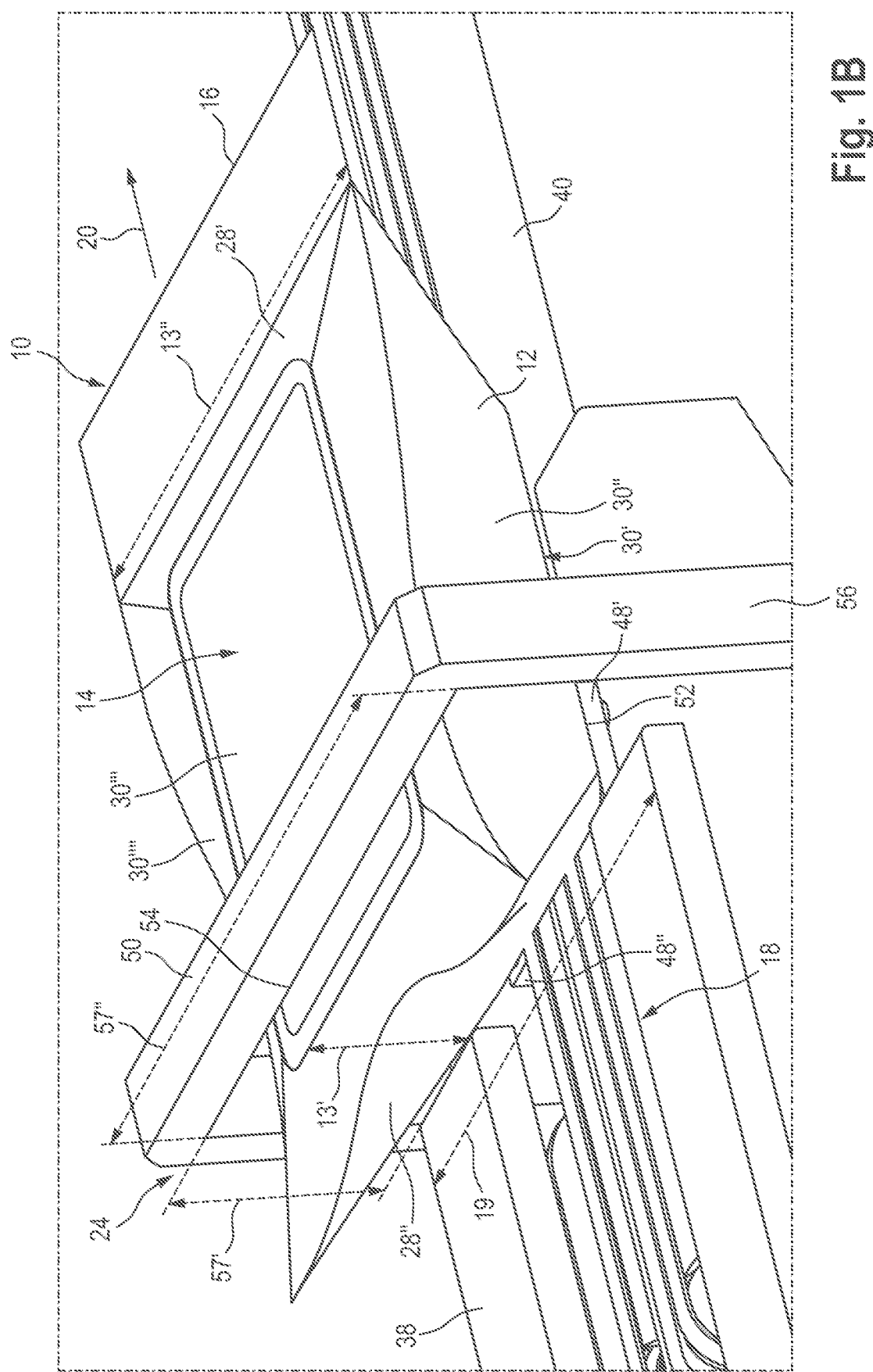
FIG. 1B shows an enlarged section of the view of the stretching device in FIG. 1A.
Figure 3:
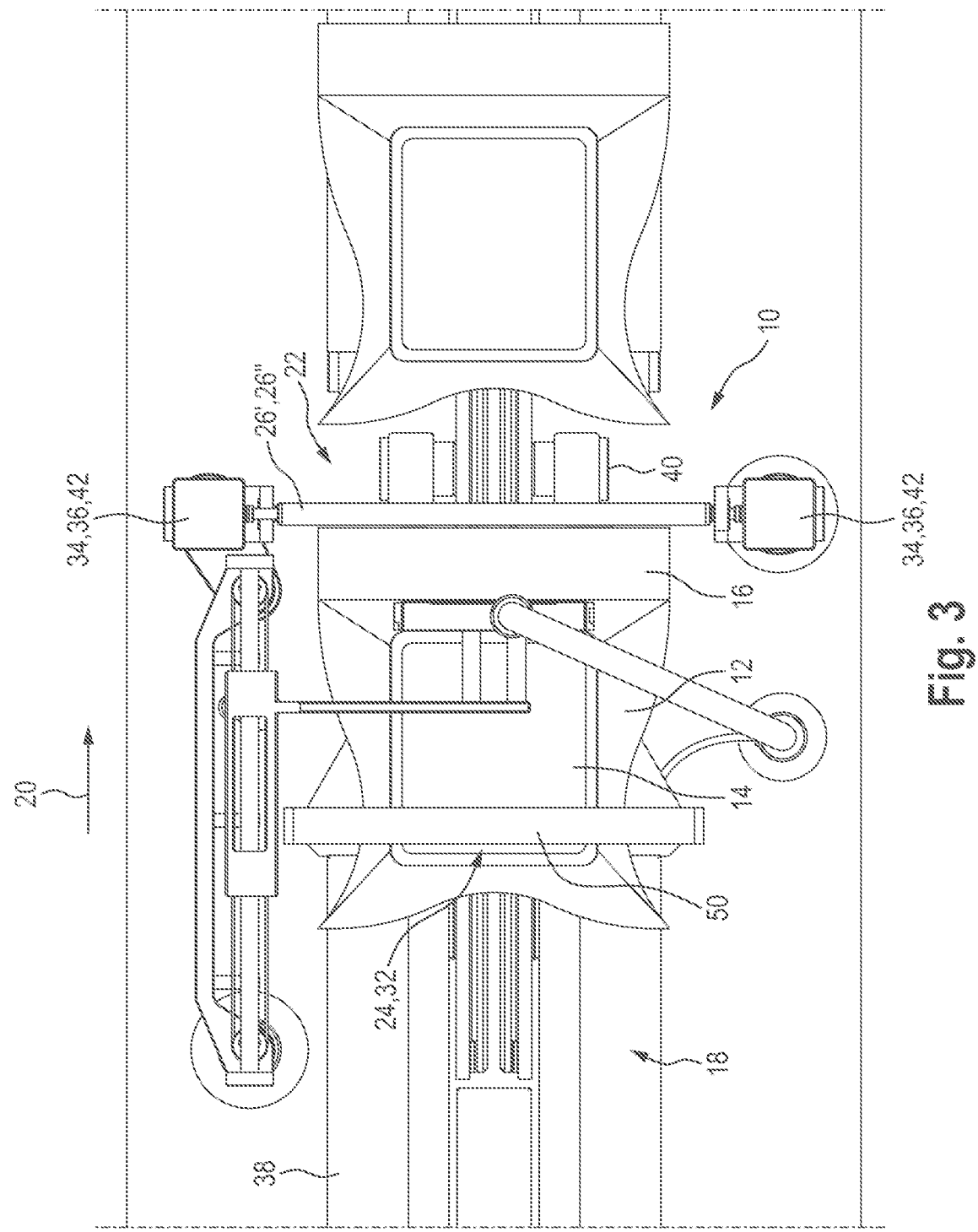
FIG. 3 shows a plan view of the stretching device in FIG. 1A.

FIGS. 1A, 1B, 2, and 3 shows an embodiment of a stretching device 10. The stretching device 10 is configured for stretching an item of packaging 12. An object 14 is packed in the item of packaging 12. The item of packaging 12 has a packaging portion 16 which is disposed on the side of the item of packaging 12 and projects from the item of packaging 12. The stretching device 10 has a transportation installation 18, a holding installation 22, and a motion installation 24.

The transportation installation 18 is configured for transporting the object 14 in a transportation direction 20. The item of packaging 12 in relation to the transportation direction 20 has an upstream end side 28" and a downstream end side 28'. The item of packaging 12 in relation to the transportation direction 20 furthermore has four longitudinal sides 30', 30", 30''', and 30''''. A longitudinal side 30' that faces the transportation installation (18) herein faces the transportation installation 18 and is at least partially in contact with the transportation installation 18. The item of packaging 12 by way of the longitudinal side 30' that faces the transportation installation (18) accordingly bears on the transportation installation 18. A longitudinal side 30''' that faces away from the transportation installation (18) faces away from the transportation installation 18. Two lateral longitudinal sides 30" and 30'''' are disposed laterally to the transportation installation 18 and lie so as to be substantially perpendicular on the transportation installation 18. The projecting packaging portion 16 is disposed on the downstream end side 28' of the item of packaging 12. The transportation installation 18 has a transportation plane 38 on which the object 14 and the item of packaging 12 are transported.

The transportation installation 18 furthermore has clearances 40 on the two peripheries of the transportation plane 38 such that the item of packaging 12 and the object 14 bear on the transportation installation 18 and the transportation plane 38 only in a central region.

The holding installation 22 has two rollers 26', 26" that are disposed so as to be perpendicular to the transportation direction 18. The two rollers 26', 26" are disposed so as to be mutually parallel. The two rollers 26', 26" are disposed so as to be parallel with the transportation plane 38. The holding installation 22 furthermore has a rotary roller drive installation 34 for rotating the rollers 26', 26", and a translatory roller drive installation 36 for moving the rollers 26', 26". The holding installation 22 furthermore has a roller support installation 42 in which the rollers 26', 26" are disposed so as to be rotatable and movable relative to one another. The roller support installation 42 herein configures the rotary roller drive installation 34 and the translatory roller drive installation 26. The rotary roller drive installation 34 can preferably drive the rollers 26', 26" in opposite directions. The projecting packaging portion can be drawn in between the rollers on account of the counter-rotation of the rollers 26', 26". The translatory roller drive installation 36 is configured for moving the rollers relative to one another. This relative movement in this exemplary embodiment is in particular performed perpendicularly to the transportation plane 38. It can be particularly advantageous herein for the spacing between the rollers to be large when the projecting packaging portion is being introduced, and for the rollers after the introduction of the packaging portion to be moved towards one another in order for the projecting packaging portion to be jammed therebetween. The invention herein is however not restricted to two rollers. Three, four, five or more rollers can also be disposed in an alternative design embodiment in order for the projecting packaging portion to be held therebetween.

The motion installation 24 is configured for moving the object 14 conjointly with the item of packaging 12. The motion installation 24 to this end has a vertical drive 44 for a vertical movement that is perpendicular to the transportation plane 38, and a horizontal drive 46 for a movement that is parallel with the transportation plane 38, in particular parallel with the transportation direction 20. The motion installation 24 in the embodiment illustrated furthermore has a clamping installation 32 which is configured for jamming therebetween the item of packaging 12 and the object 14. The clamping installation 32 to this end has lifting elements 48', 48", and a detent element 50. The lifting elements 48', 48" are disposed such that said lifting elements 48', 48" in the case of a vertical movement that is perpendicular to the transportation plane 38 are moved through the two clearances 40 of the transportation plane 38. The lifting elements 48', 48" have a contact face 52 which comes into contact with the longitudinal side 30' of the item of packaging 12 that faces the transportation installation (18). The contact face 52 herein, in particular in an upstream region of the longitudinal side 30' that faces the transportation installation (18) comes to bear on the longitudinal side 30' that faces the transportation installation (18). The vertical drive 44 is configured for moving the lifting elements 48', 48" perpendicularly to the transportation plane 38. The object 14 conjointly with the item of packaging 12 is thus movable perpendicularly to the transportation plane 38. The detent element 50 has a bearing face 54 on which the item of packaging 12 by way of the longitudinal side 30''' that faces away from the transportation installation (18) comes to bear when clamped. The bearing face 54 herein comes to bear on the longitudinal side 30''' that faces away from the transportation installation (18) in particular in an upstream region of the longitudinal side 30''' that faces away from the transportation installation (18). On account thereof, the item of packaging 12 and the object 14 are held between the lifting elements 48', 48", and the detent element 50. The motion installation 24 furthermore has a frame 56 which includes the detent element 50 and connects the detent element 50 to the remaining components of the motion installation 24, said remaining components largely being disposed on that side of the transportation installation (18) that faces away from the item of packaging. The frame 56, proceeding from the transportation plane 38, has a height 57' which is greater than a height 13' of the item of packaging 12. On account thereof, it can be avoided that the item of packaging 12 when transported on the transportation plane 18 comes into contact with the detent element 50, in particular scrapes along the latter or catches on the latter. Contact between the item of packaging 12 and the detent element 50 is established only when the item of packaging 12 by way of the lifting elements 48', 48" is moved vertically away from the transportation plane 38 and comes to bear on the detent element 50. The frame 56 furthermore has a width 57" which is greater than a width 13" of the item of packaging 12 and is greater than a width 19 of the transportation installation 18. It can be avoided on account thereof that the item of packaging 12 when transported laterally comes into contact with the frame 56, in particular scrapes along the latter or catches on the latter.

The horizontal drive 46 of the motion installation 24 is configured for moving the item of packaging 12 and the object 14 parallel with the transportation plane 38, in particular parallel with the transportation direction 20. The horizontal drive 46 herein moves the lifting elements 48', 48" as well as the frame 56 having the detent element 50 in the horizontal direction. It is enabled on account thereof that the item of packaging is simultaneously clamped by the clamping installation 32 while said item of packaging is moved parallel with the transportation plane 38, in particular parallel with the transportation direction 20.

The motion installation 24 can be configured for moving the object 14 and the item of packaging 12 towards the rollers 26', 26" in order for the projecting packaging portion 16 to be guided through between the two rollers 26', 26". A central plane 58 which lies so as to be parallel with the transportation plane and which is equidistant from the rollers 26', 26" lies between the two rollers 26', 26". In one advantageous design embodiment, the projecting packaging portion 16 while being clamped in the clamping installation 32 of the motion installation 24 is disposed such that said projecting packaging portion 16 lies in the central plane 58. On account thereof, it is achieved in a simple manner that the projecting packaging portion 16 can be guided through the intermediate space between the two rollers 26', 26". If the projecting packaging portion 16 is not disposed in the central plane 58, the rollers 26', 26" can be mutually spaced further apart by means of the translatory roller drive installation 36, in order for a larger intermediate space, through which the projecting packaging portion 16 can be guided, to be generated between the rollers 26', 26". In one alternative design embodiment, it can be provided that the rollers 26', 26" are movable not only relative to one another but also in a conjoint parallel manner perpendicularly to the transportation plane 38. On account thereof it is enabled that the central plane 58 which lies between the rollers 26', 26" can be displaced at the height of the projecting packaging portion 16.

Alternatively or additionally to the embodiment of a stretching device 10 described in FIGS. 1A, 1B, 2, and 3, it can be provided that, instead of or in addition to the motion installation 24, the holding installation 22 is movable parallel with the transportation direction 20. To this end, the holding installation 22 can have a horizontal drive, for example, which can move the holding installation 22 parallel with the transportation direction 20. On account thereof, the object 14 and the holding installation 22 are moved away relative to one another, and the packaging portion 16 on account thereof can be likewise stretched.

Figure 4:
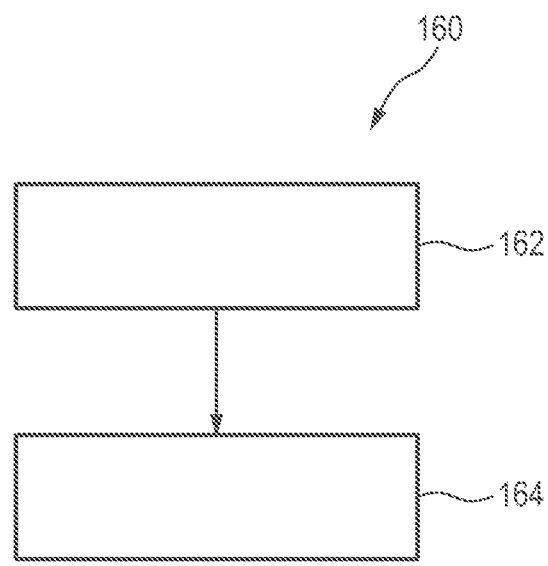
FIG. 4 shows a schematic illustration of an embodiment of a method for stretching an item of packaging.

FIG. 4 shows an embodiment of a method 160 for stretching an item of packaging 12, in particular a pouch, for an object 14, in particular a pharmaceutical or cosmetic object. The stretching device 10 which is described in FIGS. 1A to 3 is in particular suitable for carrying out the method 160 for stretching. The item of packaging 12 to be stretched herein has a projecting packaging portion 16. The object 14 is transported in a transportation direction 20 on a transportation installation 18. The individual method steps will be described in more detail hereunder.

In a first step 162 the projecting packaging portion 16 is held by a holding installation 22. The holding installation 22 has two rollers 26', 26" that are disposed so as to be perpendicular to the transportation direction 20. The projecting packaging portion 16 is held between the two rollers 26', 26". The invention herein is however not restricted to two rollers. Three, four, five or more rollers can also be disposed in an alternative design embodiment in order for the projecting packaging portion to be held therebetween.

In a second step 164 the object 14 is moved away from the holding installation 22 and parallel with the transportation installation 20. The projecting packaging portion 16 is stretched in this movement, since said projecting packaging portion 16 is held between the rollers 26', 26".

Alternatively or additionally, in the second step 164 the holding installation 22 can also be moved parallel with the transportation direction 20 and away from the object 14. The projecting packaging portion 16 is likewise stretched in this movement, since said projecting packaging portion 16 is held between the rollers 26', 26".

In the first step of moving 164 the item of packaging 12 is preferably held on at least one longitudinal side 30', 30", 30''', 30'''' by a motion installation 24. The motion installation 24 can be configured in particular as such a motion installation as has been described in the stretching device 10 in FIGS. 1A to 3.

The projecting packaging portion 16 in relation to the transportation direction 20 is preferably disposed on the downstream end side 28'. The object 14 herein in the second step of moving 164 is moved counter to the transportation direction 20 and away from the holding installation 22.

The rollers 26', 26" in the step of holding 162 are preferably rotated in opposite directions, on account of which the projecting packaging portion 16 is drawn in between the rollers 26', 26".

The rollers 26', 26" in the step of holding 162 are preferably moved in a relative manner towards one another, on account of which the rollers 26', 26" therebetween jam the projecting packaging portion 16.

FIGS. 5a to 5d show an isometric illustration of the individual method steps of the method 160 for stretching an item of packaging 12, said method 160 being described in FIG. 4.

Figure 5A:
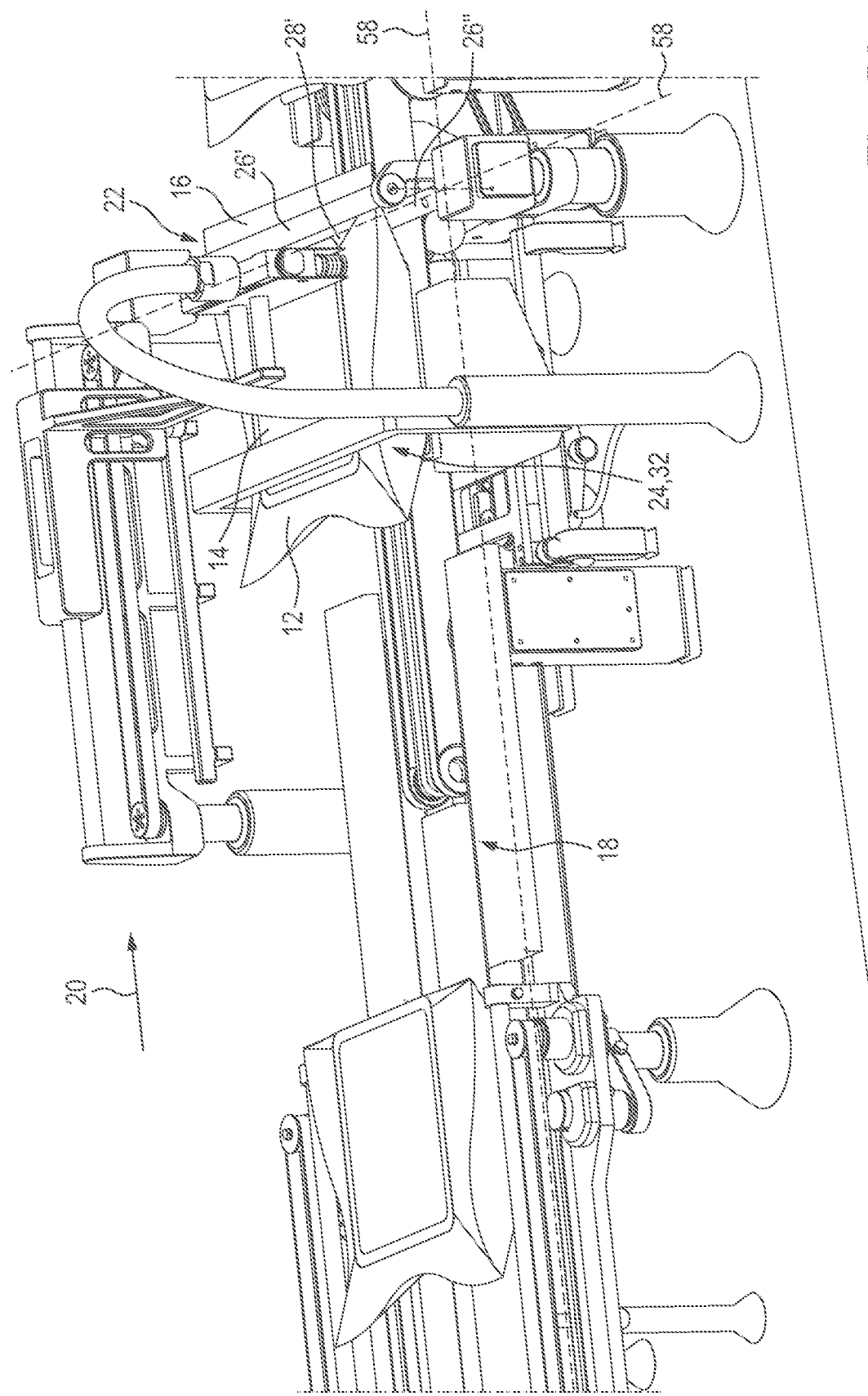
FIG. 5A shows an isometric illustration of the step for holding in the method for stretching in FIG. 4.

FIG. 5a herein shows a first part-step of the step 162 of holding, wherein a downstream region of the projecting packaging portion 16 is disposed between the rollers 26', 26". The downstream region of the packaging portion 16 herein is preferably disposed between the rollers 26', 26" in that the motion installation 24 moves the item of packaging 12 parallel with the transportation direction 20 towards the rollers and introduces the projecting packaging portion 16 between the rollers 26', 26".

FIG. 5b shows a second part-step of the step 162 of holding, in which the projecting packaging portion 16 is drawn in between the rollers 26', 26". The rollers 26', 26" herein are moved in a relative manner towards one another until they are in contact with the projecting packaging portion 16. The rollers 26', 26" in this instance are rotated in opposite directions in order for the projecting packaging portion 16 to be drawn in therebetween in the transportation direction 20.

Figure 5C:
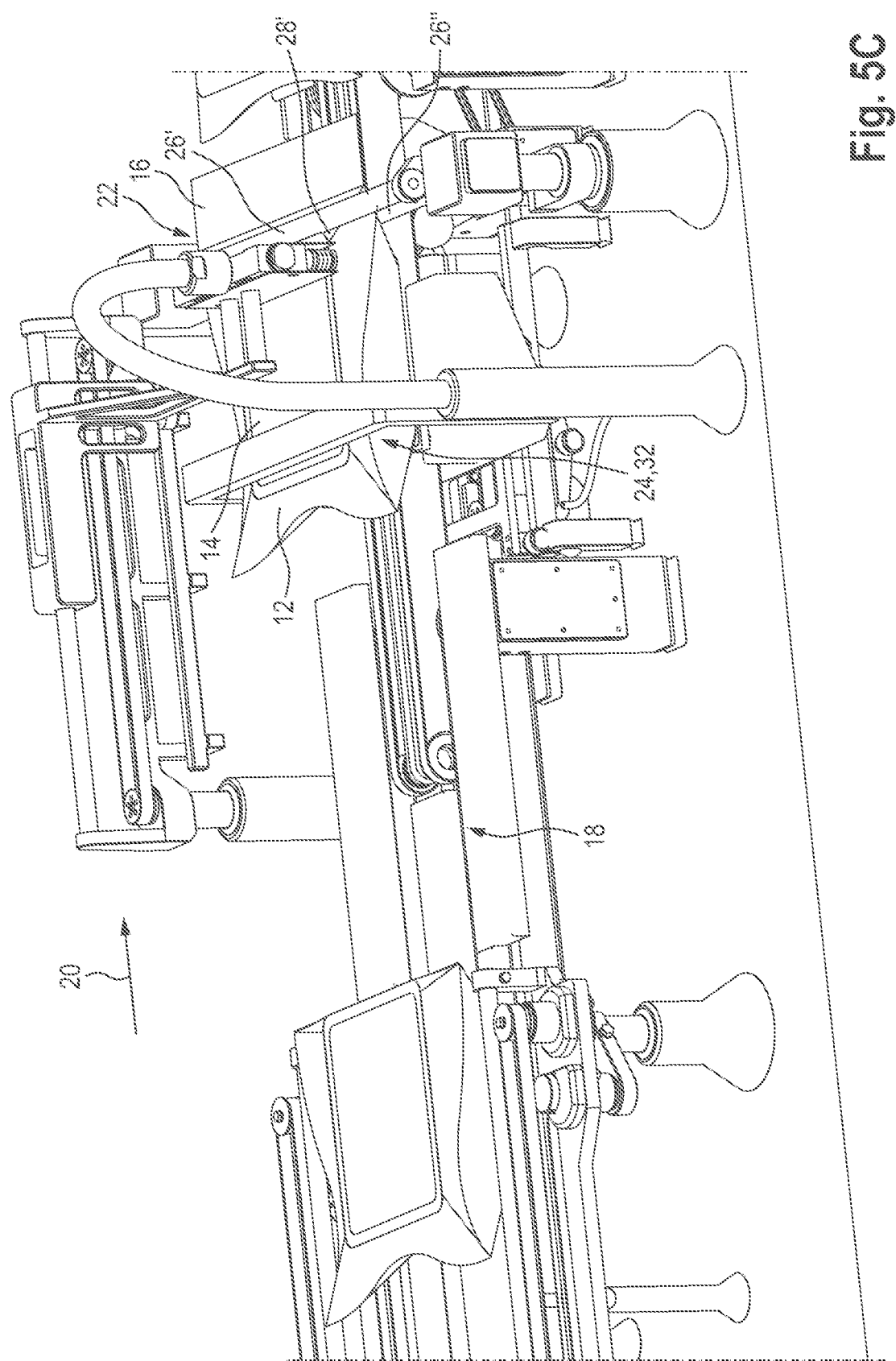
FIG. 5C shows an isometric illustration of the step for holding in the method for stretching in FIG. 4.

FIG. 5c shows an isometric illustration of a third part-step of the step 162 of holding, in which the projecting packaging portion 16 is held between the rollers 26', 26". The rollers 26', 26" herein in a first design embodiment can be mutually compressed in order for the projecting packaging portion 16 to be jammed therebetween. In one alternative design embodiment the rollers 26', 26" can be configured so as to continuously counter-rotate in order for a uniform and consistent tensile force to thus be exerted on the projecting packaging portion 16. On account of this tensile force, the projecting packaging portion 16 can likewise be held between the rollers 26', 26". In a further design embodiment, the packaging portion 16 can be held between the rollers 26', 26" in particular by way of a consistent uniform mutual counter-rotation of the rollers 26', 26" and a mutual compression of the rollers 26', 26".

Figure 5D:
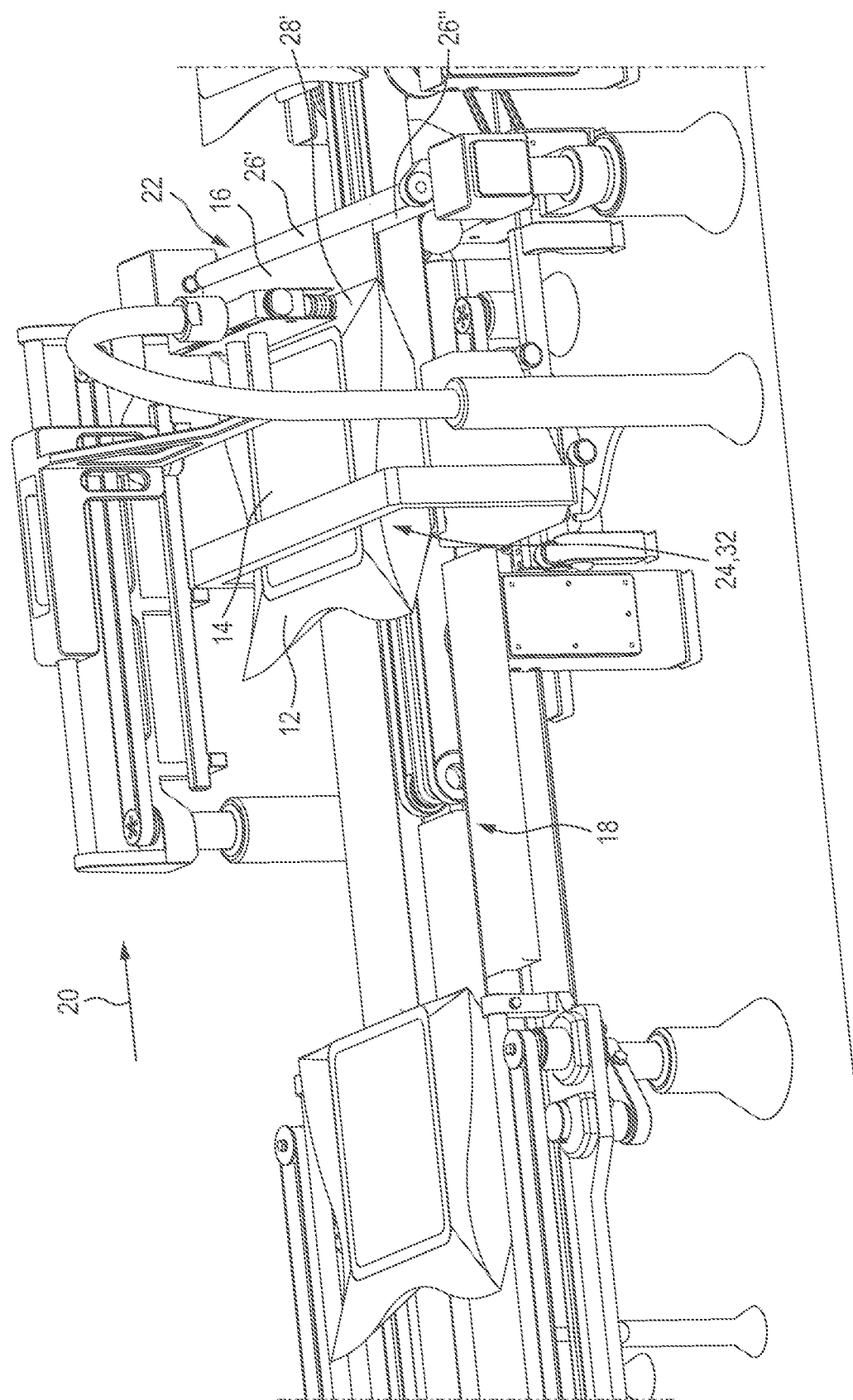
FIG. 5D shows an isometric illustration of the step of moving in the method of stretching in FIG. 4.
Figure 6A:
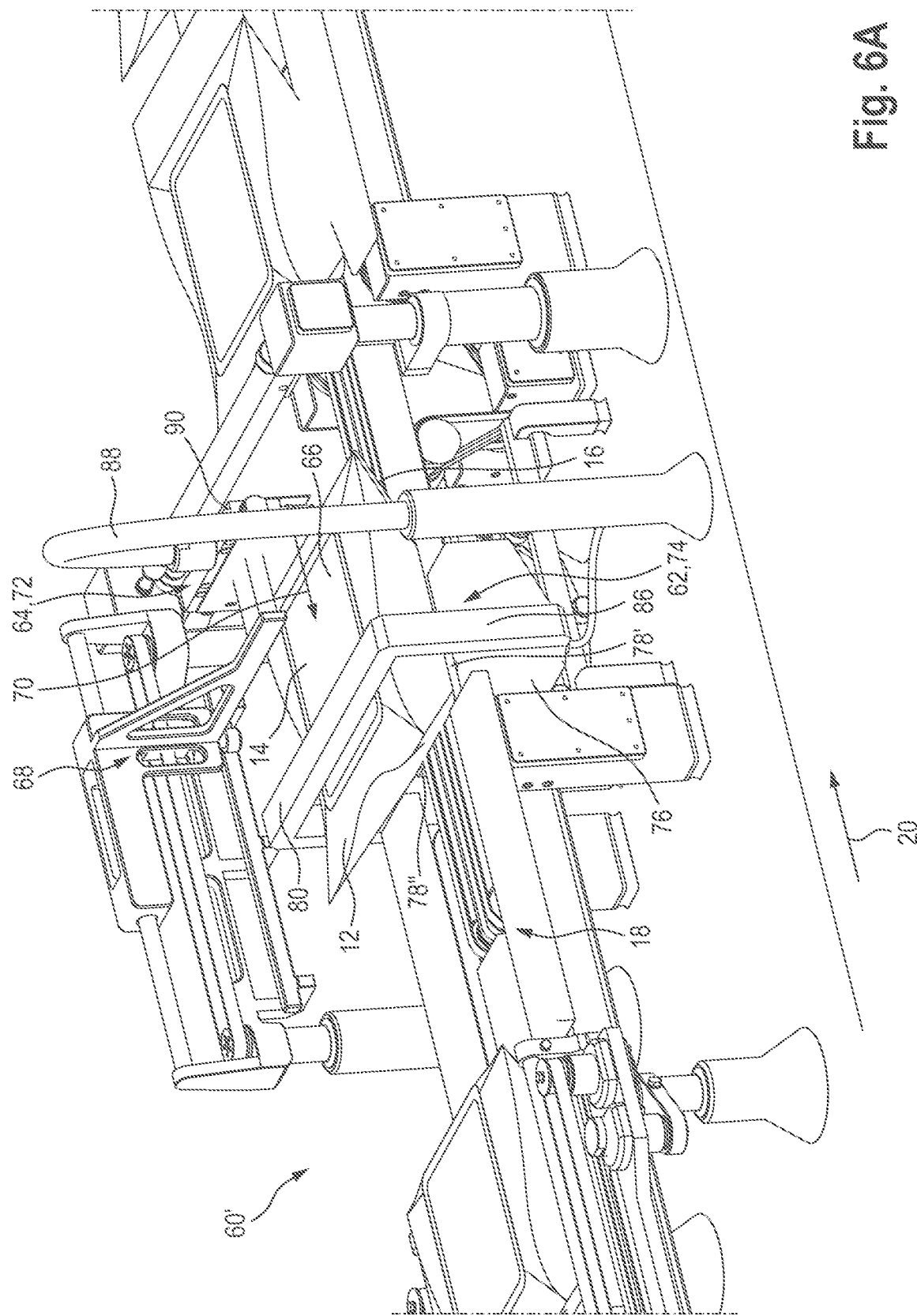
FIG. 6A shows an isometric illustration of an embodiment of a folding-out device.
Figure 6B:
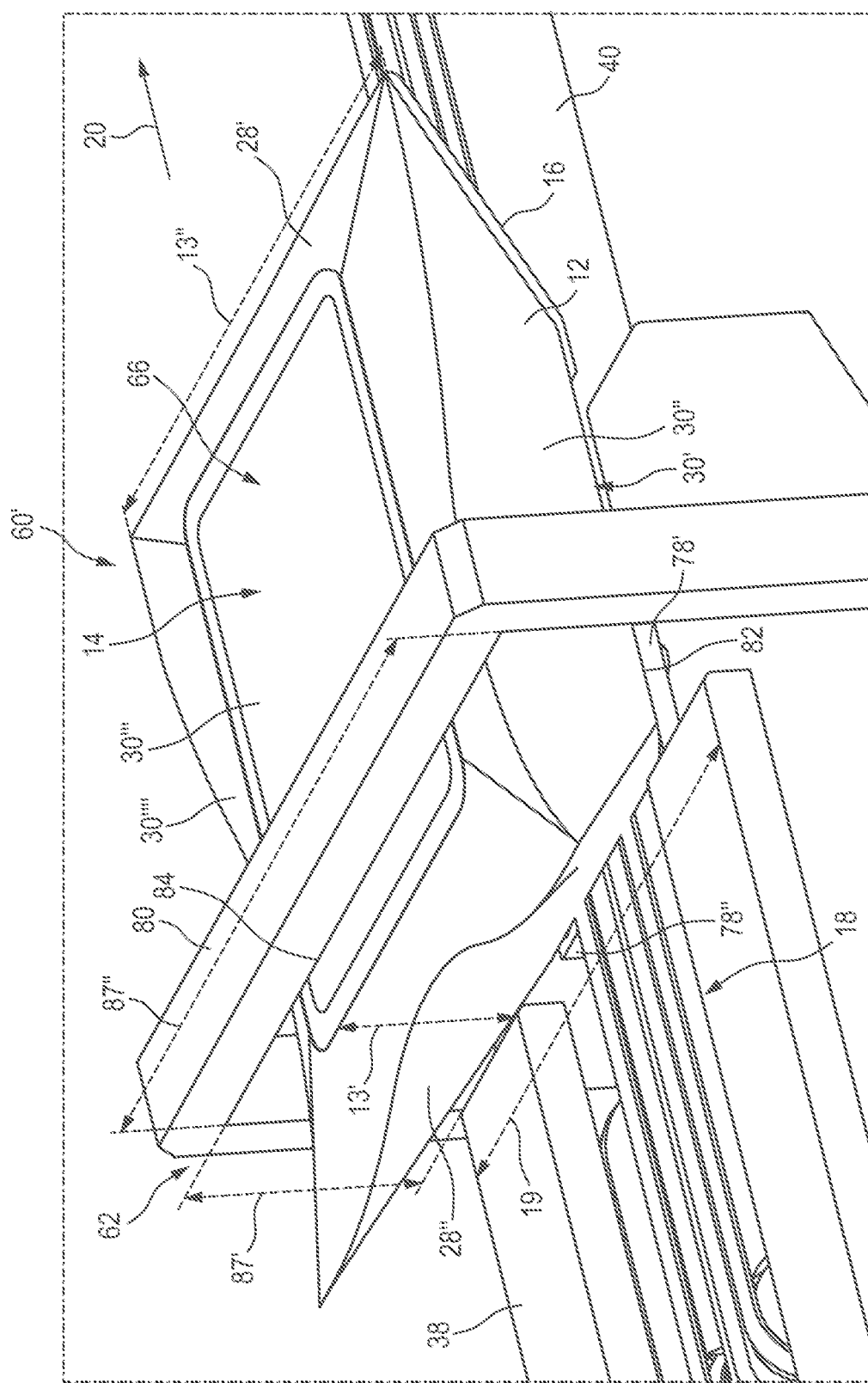
FIG. 6B shows an enlarged fragment of the view of the folding-out device in FIG. 6A.
Figure 8:
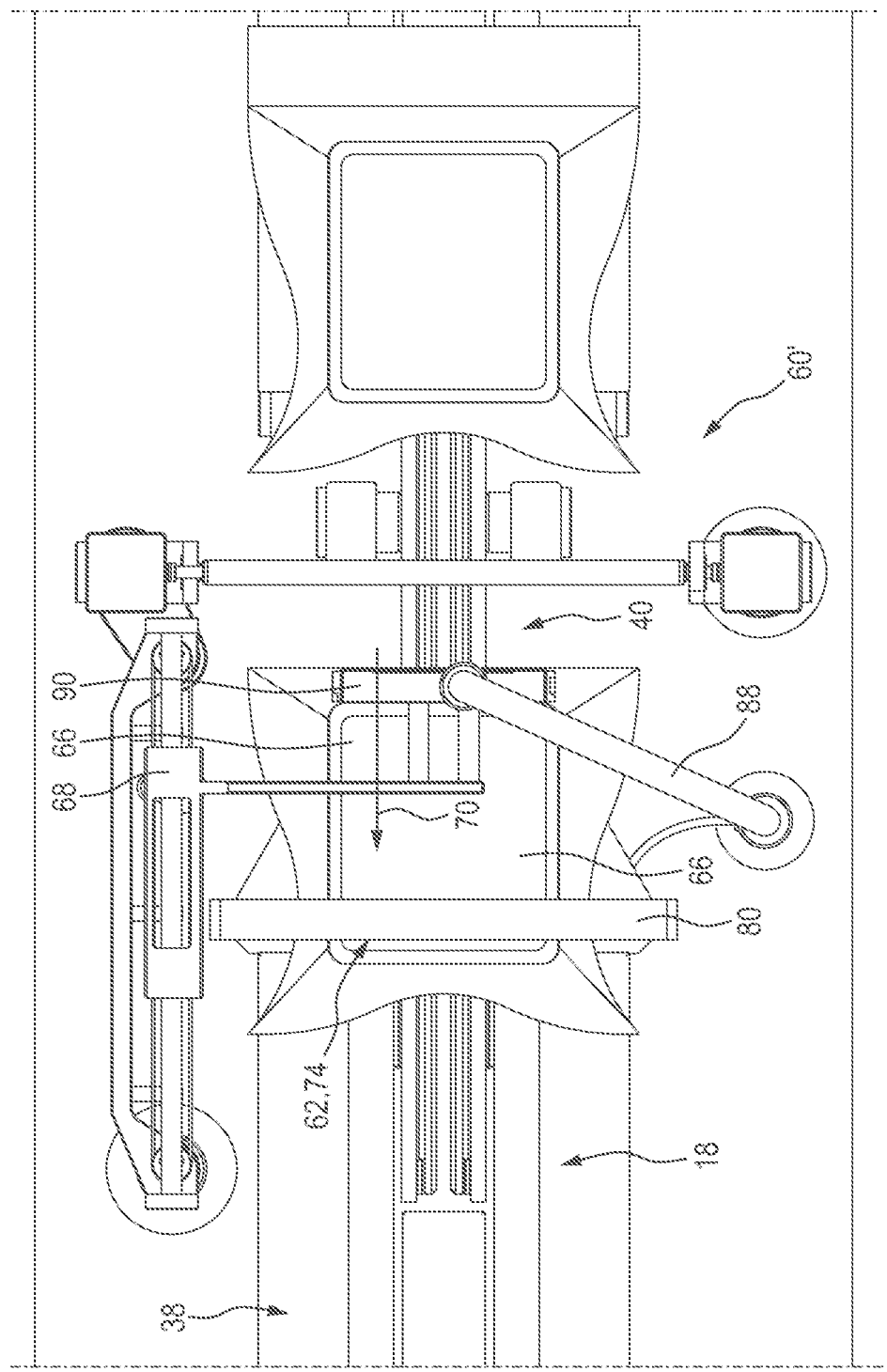
FIG. 8 shows a plan view of the folding-out device in FIG. 6A.

FIG. 5d shows an isometric illustration of the step 164 of moving, in which the item of packaging 12 and the object 14 by the motion installation 24 are moved away from the rollers 26', 26", on account of which the projecting packaging portion 16 and a part-region of the downstream end side 28' of the item of packaging 12 are stretched.

FIGS. 6A, 6B, 7, and 8 show an embodiment of a folding-out device 60'. The folding-out device 60' is configured for folding outwards a folded-in packaging portion 16 of an item of packaging 12. An object 14 is packed in the item of packaging 12. The folding-out device 60' has a transportation installation 18, a lifting installation 62, a holding installation 64, and a holding-installation drive installation 68.

The transportation installation 18 is configured for transporting the object 14 in a transportation direction 20. The item of packaging 12 in relation to the transportation direction 20 has an upstream end side 28" and a downstream end side 28'. The item of packaging 12 in relation to the transportation direction 20 furthermore has four longitudinal sides 30', 30", 30"', and 30"". A longitudinal side 30' that faces the transportation installation (18) herein faces the transportation installation and is at least partially in contact with the transportation installation 18. The item of packaging 12 by way of the longitudinal side 30' that faces the transportation installation (18) accordingly bears on the transportation installation 18. An upper longitudinal side 30"' faces away from the transportation installation 18. Two lateral longitudinal sides 30" and 30"" are disposed laterally to the transportation installation 18 and lies so as to be substantially perpendicular on the transportation installation 18. The packaging portion 16 is connected to the remainder of the item of packaging on the downstream end side 28' of the item of packaging 12. The packaging portion 16 initially extends along the downstream end side 28' in the direction of the longitudinal side 30' of the item of packaging 12 that faces the transportation installation (18), and further partially along the longitudinal side 30' of the item of packaging 12 that faces the transportation installation (18). The packaging portion 16 is thus partially disposed between the longitudinal side 30' of the item of packaging 12 that faces the transportation installation (18) and the transportation installation 18. The packaging portion 16 initially is thus folded inwards between the transportation installation 18 and the longitudinal side 30' of the item of packaging 12 that faces the transportation installation (18). The transportation installation 18 has a transportation plane 38 on which the object 14 and the item of packaging 12 are transported.

The transportation installation 38 furthermore has clearances 40 on the two peripheries of the transportation plane 38, such that the item of packaging 12 and the object 14 bear on the transportation installation 18 and on the transportation plane 38 only in a central region.

The lifting installation 62 is configured for raising the object 14 conjointly with the item of packaging 12. To this end, the lifting installation 62 has a vertical drive 76 for vertically moving the object perpendicularly to the transportation plane 38. The lifting installation 62 in the embodiment illustrated furthermore has a clamping installation 74 which is configured for therebetween jamming the item of packaging 12 and the object 14. To this end, the clamping installation 74 has lifting elements 78', 78", and a detent element 80. The lifting elements 78', 78" are disposed such that said lifting elements 78', 78" in a vertical movement perpendicular to the transportation plane 78 are moved through the two clearances 40 of the transportation plane 38. The lifting elements 78', 78" have a contact face 82 which come into contact with the longitudinal side 30' of the item of packaging 12 that faces the transportation installation (18). The contact face 82, in particular in an upstream region of the longitudinal side 30' that faces the transportation installation (18), herein comes to bear on the longitudinal side 30' that faces the transportation installation (18). The vertical drive 76 is configured for moving the lifting elements 78', 78" perpendicularly to the transportation plane 38. The object 14 can therefore be moved conjointly with the item of packaging 12 perpendicularly to the transportation plane 38. The detent element 80 has a bearing face 84 on which the item of packaging 12 by way of the longitudinal side 30"' that faces away from the transportation installation (18) comes to bear when clamped. The bearing face 84 herein comes to bear on the longitudinal side 30"' that faces away from the transportation installation (18) in particular in a downstream region of the longitudinal side 30"' that faces away from the transportation installation (18). On account thereof, the item of packaging 12 and the object 14 are held between the lifting elements 78', 78" and the detent element 80. The lifting installation 62 furthermore has a frame 86 which includes the detent element 80 and connects the detent element 80 to the remaining components of the lifting installation 62, said remaining components largely being disposed on that side of the transportation installation 18 that faces away from the item of packaging (12). The frame 86, proceeding from the transportation plane 38, has a height 87' which is greater than a height 13' of the item of packaging 12. It can be avoided on account thereof that the item of packaging 12 when transported on the transportation plane 38 comes into contact with the detent element 80, in particular scrapes along the latter or catches on the latter. A contact between the item of packaging 12 and the detent element 80 can be established only when the item of packaging 12 by way of the lifting elements 78', 78" is moved vertically away from the transportation plane 38 and comes to bear on the detent element 80. The frame 86 furthermore has a width 87" which is greater than a width 13" of the item of packaging 12 and is greater than a width 19 of the transportation installation 18. It can be avoided on account thereof that the item of packaging 12 when transported laterally comes into contact with the frame 86, in particular scrapes along the latter or catches on the latter.

The holding installation 64 has a suction installation 72 which suctions and holds a region 66 of the item of packaging 12 that is adjacent to the packaging portion 16. In the embodiment illustrated, the adjacent region 66 corresponds to a downstream region of the longitudinal side 30''' that faces away from the transportation installation (18). The suction installation 72 furthermore has a suction head 90, a hose 88, and an installation for generating a vacuum (not illustrated). The suction head 90 bears on the adjacent region 66 in order for the latter to be suctioned. The hose 88 connects the suction head 90 to the installation for generating a vacuum (not illustrated). The installation for generating a vacuum can be a vacuum pump, for example.

The holding-installation drive installation 68 is configured for moving the suction installation 72 parallel with the transportation direction 20. The holding-installation drive installation 68 herein can move the suction installation counter to the transportation direction when the suction installation 72 suctions and holds the adjacent region 66 of the item of packaging 12. On account thereof, the folded-in packaging portion 16 is folded outwards. The holding-installation drive installation 68 can furthermore be configured for moving the suction installation 72 by means of a pivoting movement or a lifting movement.

Alternatively to the embodiment of a folding-out device 60' described in FIGS. 6A, 6B, 7, and 8, it can be provided that the initially folded-in packaging portion 16 instead of being folded inwards onto that side of the item of packaging 12 that faces the transportation installation 18 is folded inwards onto the longitudinal side 30''' of the item of packaging 12 that faces away from the transportation installation 18. Accordingly, the holding installation 62 is also disposed on the longitudinal side 30' of the item of packaging 12 that faces the transportation installation 18 and engages on the longitudinal side 30' of the item of packaging 12 that faces the transportation installation 18, wherein the longitudinal side 30' that faces the transportation installation 18 is an adjacent region 66 of the packaging portion 16. The folded-in packaging portion can likewise be folded outwards by way of such an arrangement.

Figure 9:
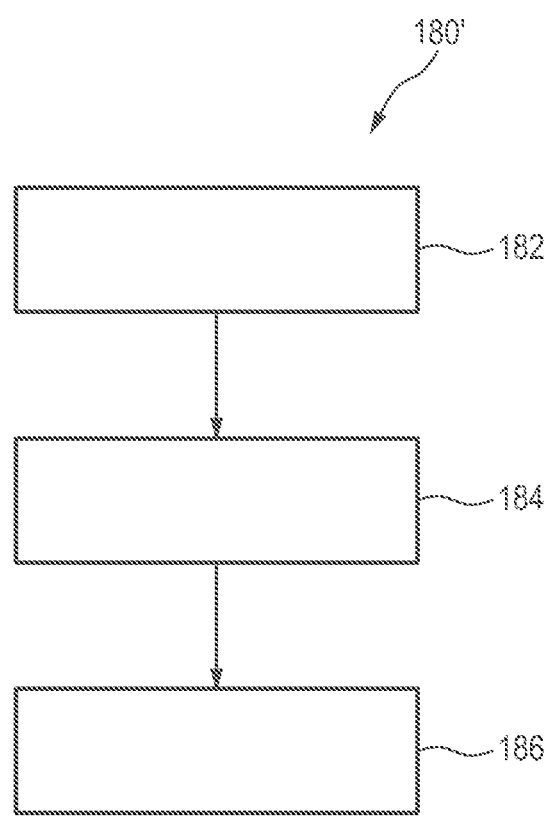
FIG. 9 shows a schematic illustration of an embodiment of a method for folding outwards.

FIG. 9 shows an embodiment of a method 180' for folding outwards a packaging part 16 of an item of packaging 12, in particular a pouch, for an object 14, in particular a pharmaceutical or cosmetic object. The folding-out device 60' which is described in FIGS. 6A to 8 is in particular suitable for carrying out the method 180' for folding outwards. The object 14 herein is transported in a transportation direction 20 on a transportation installation 18. The packaging portion 16 initially is folded inwards between the transportation installation 18 and the item of packaging 12, in particular a longitudinal side 30' of the item of packaging 12 that faces the transportation installation (18). The individual method steps will be described in more detail hereunder.

In a first step 182 the object 14 is raised from the transportation installation 18 by a lifting installation 62. The lifting installation 62 herein on that side of the item of packaging that faces away from the transportation installation (18) can have a detent element 80 against which the item of packaging 12 and the object 14 are pushed in the raising 182 of the object 14. The lifting installation 62 is in particular configured for raising and holding the item of packaging 12 of the object 14.

The lifting installation 62 in the step of raising 182 preferably holds the item of packaging 12 on at least one lateral face 30', 30", 30''', 30''''.

Alternatively or additionally, the lifting installation 62 in the first step 182 can also raise the transportation installation 18, in particular the transportation plane 38 of the transportation installation 18, at least in the bearing region of the item of packaging 12 on the transportation plane 38.

In a second step 184 a region 66 of the item of packaging 12 that is adjacent to the packaging portion 16 is held by a holding installation 64. The adjacent region 66 herein corresponds in particular to a downstream region of the longitudinal side 30''' that faces away from the transportation installation (18). The holding installation 64 can preferably have a suction installation 72 which suctions and holds the adjacent region 66.

The holding installation 64 in the step of holding 184 preferably holds the item of packaging 12 on the longitudinal side 30''' that faces away from the transportation installation (18).

In a third step 186 the holding installation 64 is moved in a direction 70 that points away from the packaging portion 16. A tensile force which draws the folded-in packaging portion 16 from the folded-in position thereof between the transport installation 18 and the item of packaging 12 and thus folds said folded-in packaging portion 16 outwards is exerted on the folded-in packaging portion 16 in this movement.

The holding device 64 in the step of moving 186 is preferably moved parallel with the transportation direction 20, on account of which the packaging portion 16 is folded outwards.

Figure 10B:
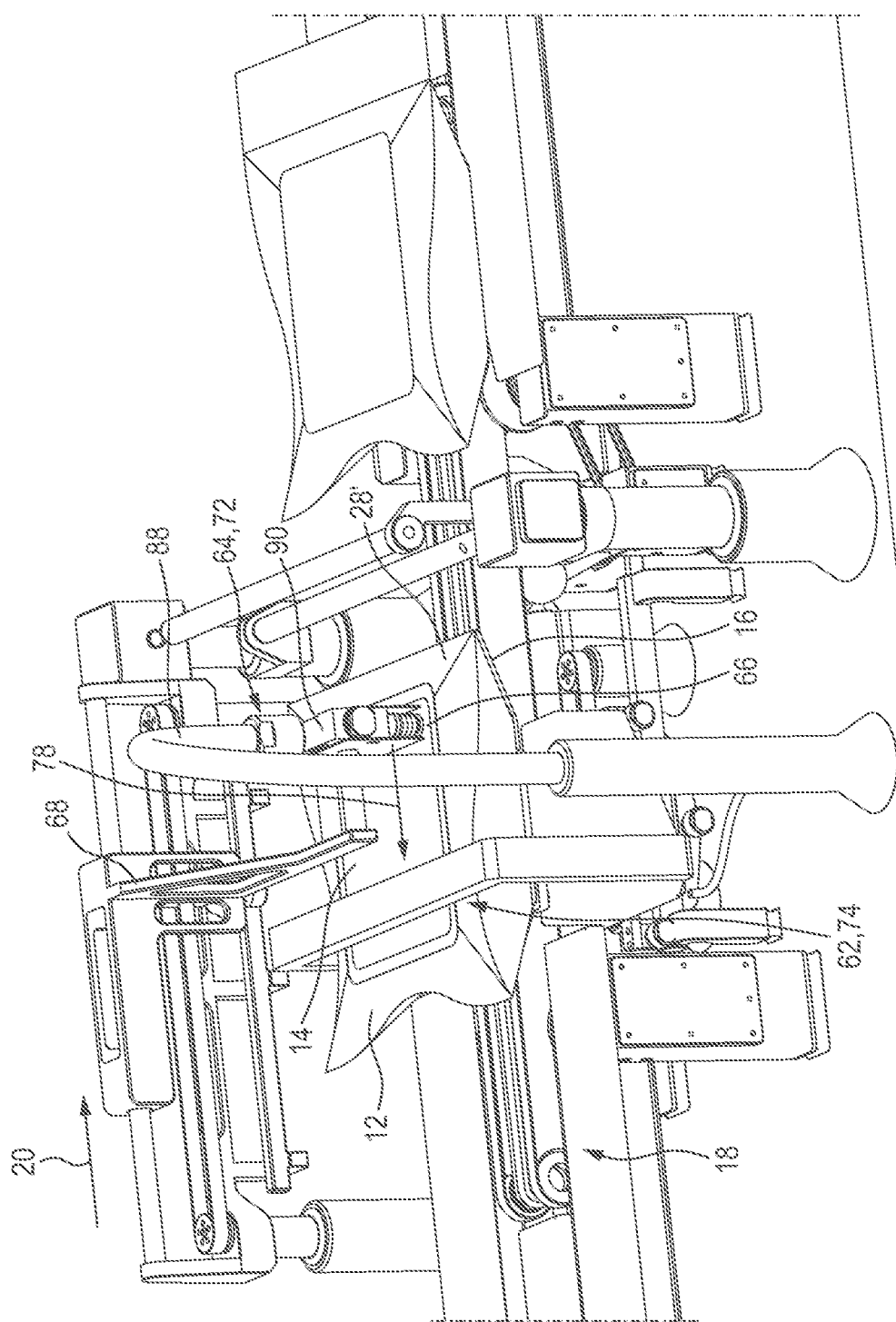
FIG. 10B shows an isometric illustration of the step for holding in the method for folding outwards in FIG. 9.
Figure 10C:
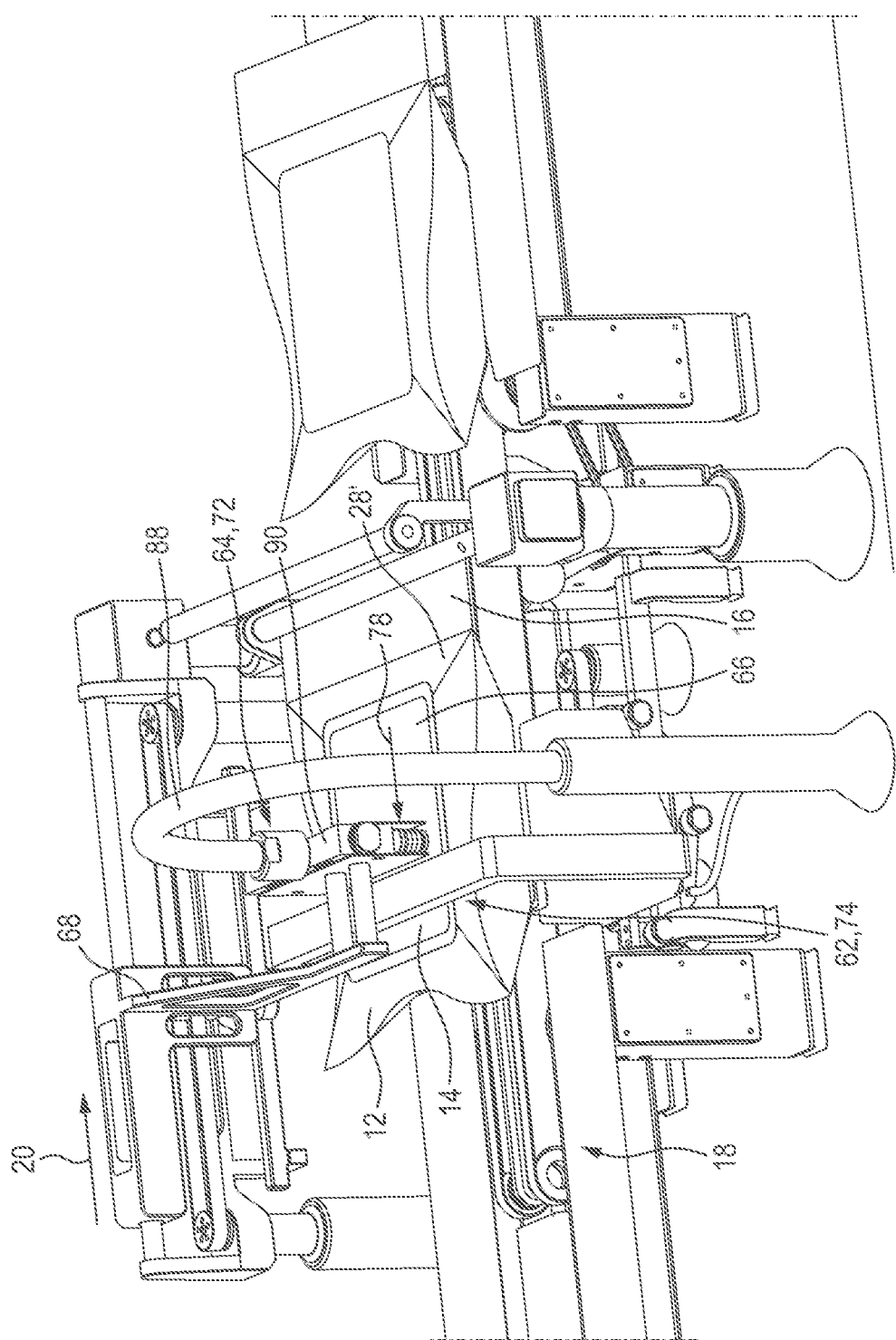
FIG. 10A shows an isometric illustration of the step for raising in the method for folding outwards in FIG. 9.
FIG. 10O shows an isometric illustration of the step for moving in the method for folding outwards in FIG. 9.

FIGS. 10a to 10c show an isometric illustration of the individual method steps of the method 180' for folding outwards the packaging portion 16, said method 180' being described in FIG. 9.

FIG. 10a shows the step of raising 182, in which the lifting installation 62 is disposed on that side of the object 14 that faces the transportation installation (18) and on account of a movement that is perpendicular to the transportation plane 38 is configured for raising the object 14 and the item of packaging 12. In one advantageous design embodiment, the longitudinal side 30''' that faces away from the transportation installation (18) herein is pushed against a detent element 80. The detent element 80 herein comes into contact with an upstream region of the longitudinal side 30''' that faces away from the transportation installation (18). On account of the lifting installation 64 pushing the object 14 and the item of packaging 12 against the detent element 80, the object 14 and the item of packaging 12 are clamped and held on account thereof.

FIG. 10*b* shows an isometric illustration of the step of holding 184, in which a suction installation 72 suctions a downstream region of the longitudinal side 30''' that faces away from the transportation installation (18). The folded-in packaging portion on the downstream end side 28' is connected to the item of packaging 12. The downstream region of the longitudinal side 30''' that faces away from the transportation installation (18) thus corresponds to a region 66 that is adjacent to the packaging portion 16.

FIG. 10*c* shows an isometric illustration of the step of moving 186, in which the holding installation by means of a holding-installation drive installation is moved counter to the transportation direction 20 and away from the packaging portion 16. The suction installation 72 herein is in particular moved towards the detent element 80 of the lifting installation 62. On account of this movement, the folded-in packaging portion 16 is drawn out from a folded-in position between the transportation installation 18 and the longitudinal side 30' that faces the transportation installation (18) and is folded outwards.

Figure 11:
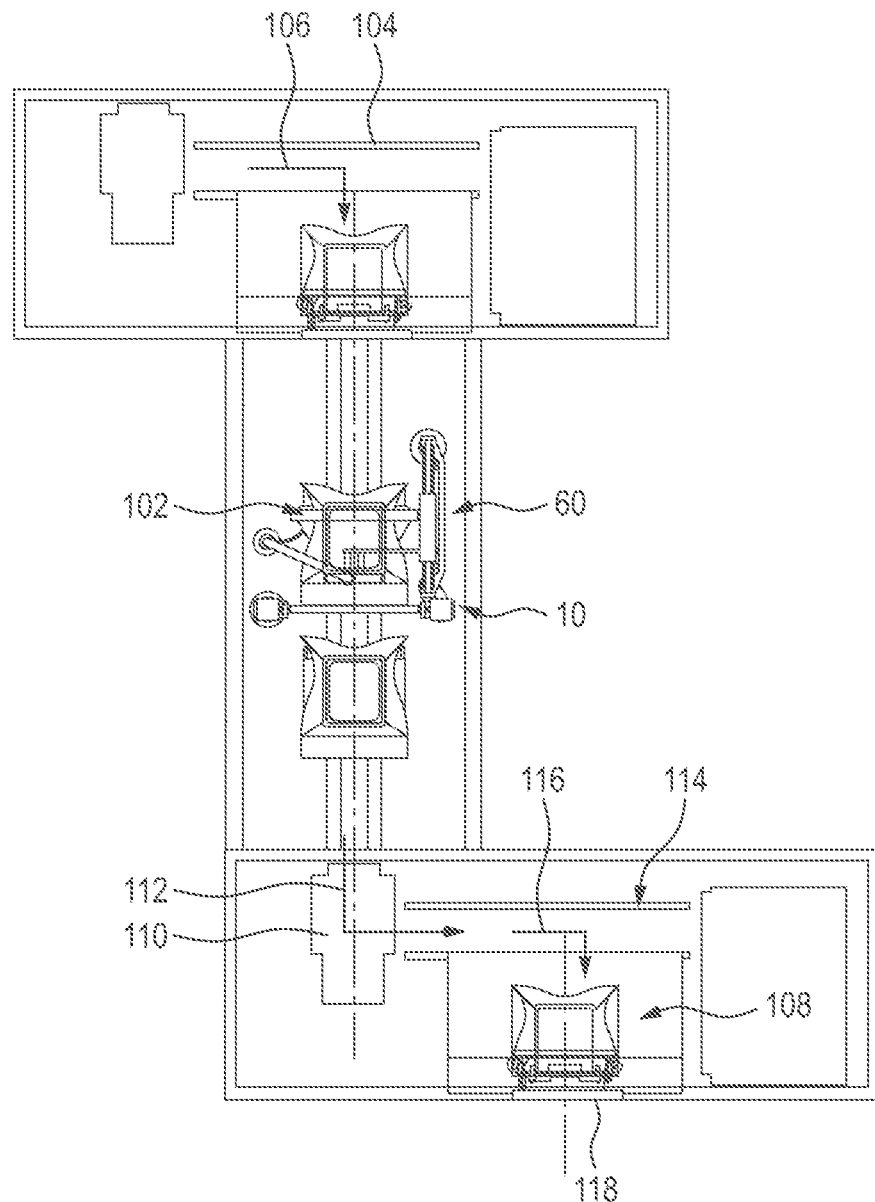
FIG. 11 shows a plan view of an embodiment of an unpacking system.

FIG. 11 shows an embodiment of an unpacking system 100. The unpacking system 100 has a transportation installation 18, a folding-out device 60, a stretching device 10, and a severing device 108.

The folding-out device 60 herein can be formed either by the embodiment of a folding-out device 60' described in FIGS. 6A, 6B, 7, 8, or by the embodiment of a folding-out device 60" described in FIGS. 14A, 14B, 15, 16.

The transportation installation 18 has a transportation plane 38 on which an object 14, in particular a pharmaceutical or cosmetic object, is transported. The object is packed in an item of packaging, in particular a pouch. The item of packaging 12 has a packaging portion 16 which initially is folded inwards between the transportation installation 18 and the item of packaging 12. The object 14 is transported in a transportation direction 20 on the transportation installation 18. The transportation installation 18 is configured for transporting the packed object 14 towards the folding-out device 60, from the stretching device 10 to the severing device 108, and away from the severing device 108. The folding-out device 60 and the stretching device 10 herein are disposed to as to be directly beside one another. The unpacking system 100 herein can in particular have one or a plurality of first movable support holders 102 which configure the lifting installation 64 of the folding-out device 60, and the motion installation 24 of the stretching device 10. The unpacking system 100 can furthermore in particular have one or a plurality of second movable support holders 103 which configure the detent installation 92 of the folding-out device 60" and the holding installation 22 of the stretching device 10. The first and the second support holders 102, 103 can in particular be movable perpendicularly to and/or parallel with the transportation direction.

In one alternative embodiment it can also be provided that the stretching device 10 and the folding-out device 60 are disposed so as to be mutually spaced apart, and the transportation installation 18 is configured for transporting the object 14 from the folding-out device 60 to the stretching device 10.

The severing device 108 has a cutter, a retrieving device, and a discarding installation. The cutter is disposed such that said cutter is movable perpendicularly to the transportation direction in order for the projecting packaging portion 16 to be cut off and for the item of packaging 12 thus to be open.

In one alternative design embodiment, a laser, a gripping blade, or a thermal separation method such as, for example, a hot wire or hot air, can also be used instead of the cutter in order for the projecting packaging portion 16 to be severed from the item of packaging 12. The retrieving installation is configured for retrieving the object 14 from the item of packaging 12, that is to say that the retrieving installation is thus configured for mutually separating the object 14 and the item of packaging 12. Various methods for retrieving an object from an opened item of packaging are known in the prior art. For example, to this end a holding installation can hold the item of packaging, and a gripping installation can retrieve the object from the item of packaging. Alternatively, the object can be fixedly held by a holding installation while a gripping installation holds the item of packaging and pulls the item of packaging down from the object 14.

The discarding installation is configured for discarding the severed packaging portion 16 and the remainder of the item of packaging 12. The two separated packaging parts of the item of packaging 12 herein can be discarded in a mutually separate manner or collectively. For example, the discarding installation to this end can have a further transportation installation, for example a conveyor belt, onto which the remainders of the packaging are placed and by which the remainders of packaging are transported away from the severing device 108.

The transportation installation can be configured for transporting the unpacked object 14 from the severing device 108 into a cleanroom 124.

By virtue of the special spatial requirements which can be traced back, for example, to limitations by and of the variable space requirements in industrial sheds, it can be advantageous for the transportation installation 18 to not be constructed in a linear manner but instead having deflection portions between the individual devices, the folding-out device 60, the stretching device 10, and/or the severing device 108, and upstream of the folding-out device 60 and downstream of the severing device 108, said deflection portions causing a directional change of the transportation direction 20.

The transportation installation 18 herein, in particular upstream of the folding-out device 60, can have a first deflection portion 104 which causes a first directional change 106 of the transportation direction 20, in particular wherein the first directional change 106 is 90°.

The transportation installation 18 can have a second deflection portion 110 between the stretching device 10 and the severing device 108 which causes a second directional change 112 of the transportation direction 20, in particular wherein the second directional change 112 is 90°.

The transportation installation 18, upstream of, in, or downstream of the severing device 108 can have a third deflection portion 114 which causes a third directional change 116 of the transportation direction 20, in particular wherein the third directional change 116 is 90°.

In one alternative design embodiment of the unpacking system it can be provided that the unpacking system has a folding-out device 60" as described in FIGS. 14A to 18C, a stretching device 10 as described in FIGS. 1A to 5D, and a severing device 108 which is identical to the severing device 108 of the unpacking system 100 described in FIG. 11.

However, the folding-out device 60" does not have any lifting installation, and the stretching device 10 does not have any motion installation. Instead, the item of packaging is continuously transported downstream in the transportation direction 20 on the transportation installation 18.

The unpacking system has a support holder 103 which configures the detent installation 92 of the folding-out device 60" and the holding installation 24 of the stretching device 10. The roller 94' of the detent installation 92 thus corresponds to the roller 26" of the holding device 24, and the roller 94" of the detent installation 92 corresponds to the roller 26" of the holding device 24.

Such an arrangement of an unpacking system requires that the packaging portion 16 is disposed on the end side of the item of packaging 12 that lies upstream, and from there extends on to one of the longitudinal sides which either faces of faces away from the transportation installation. The rollers 26', 26", or 94', 94", respectively, are furthermore configured so as to be movable relative to one another, in order for the rollers to be mutually spaced apart so far that the item of packaging 12 can be transported through between the rollers and for one of the rollers to be able to form a detent for the folded-in packaging portion, on the one hand, and in order for the packaging portion 16 to be clamped and held therebetween, on the other hand.

The functional mode of the alternative unpacking system will be described hereunder.

The object 14 is transported downstream in the transportation direction 20 on the transportation installation 18. The rollers 26', 26", or 94', 94", respectively, are mutually spaced apart so far that the item of packaging 12 can be guided through between the rollers 26', 26", or 94', 94", respectively. The rollers 26', 26", or 94', 94", respectively, are brought to bear on the longitudinal side 30', 30" that faces and faces away from the transportation installation 18. On account thereof, one of the rollers forms a detent for the folded-in packaging portion 16. The transportation installation 18 transports the object 12 onwards, on account of which the packaging portion 16 is pushed on to one of the rollers which forms the detent. The packaging portion 16 is folded outwards on account thereof. The rollers in this instance are moved relative to one another in order for the packaging portion 16 to be clamped and held, on account of which the packaging portion 16 is stretched.

The alternative unpacking system preferably has a clamping device which is configured so as to be movable parallel with as well as perpendicularly to the transportation direction. The clamping installation is disposed downstream behind the support holder 103 which configures the detent installation 92 and the holding installation 24. The clamping device therebetween jams the item of packaging 12 and the object 14 after said object 14 has partially passed the rollers. In order for the object 14 and the item of packaging 12 on account thereof not to be stopped or to be only briefly stopped, the clamping device after clamping moves conjointly with the object downstream in the transportation direction 20 at a speed which corresponds to the conveying speed of the transportation installation 18. The folding outwards and stretching is improved on a account thereof.

Figure 12A:
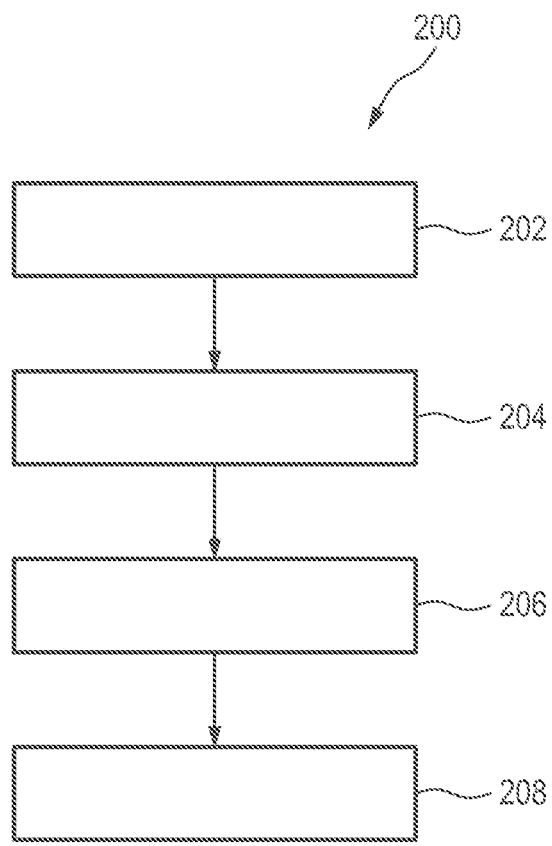
FIG. 12A shows a schematic illustration of a first embodiment of a method for unpacking.

FIG. 12A shows a first embodiment of a method 200' for unpacking an object 14, in particular a pharmaceutical or cosmetic object, from an item of packaging 12, in particular a pouch. The object 14 is transported in a transportation direction 20 on a transportation installation 18. A packaging portion 16 of the item of packaging 12 initially is folded inwards between the transportation installation 18 and the item of packaging 12.

In a step 202, the packaging portion 16 is folded outwards by means of the method 180 which is described in FIGS. 9 and 10a to 10c.

Figure 17:
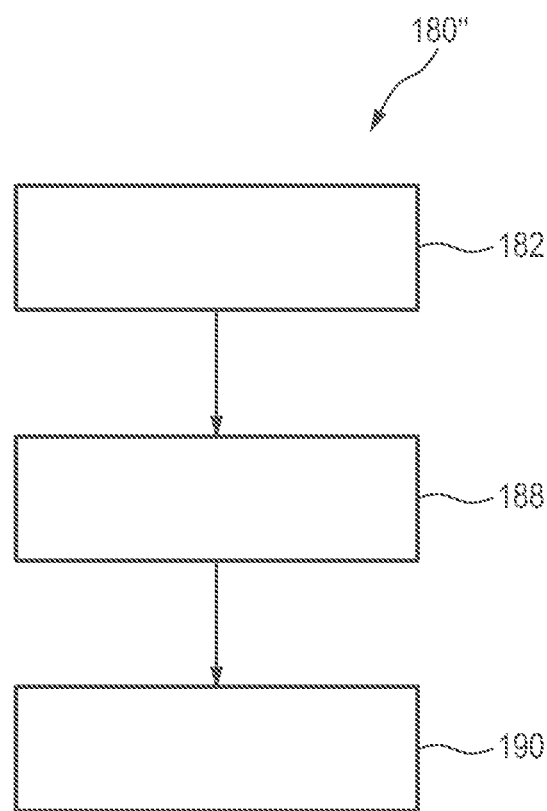
FIG. 17 shows a schematic illustration of an embodiment of a further method for folding outwards.

The method 180 herein can be carried out either by the embodiment of a method for folding outwards 180' described in FIG. 9, or by the embodiment of a method for folding outwards 180" described in FIG. 17.

In a further step 204, the projecting packaging portion 16 is stretched by means of the method 160 which is described in FIGS. 4 and 5a to 5d.

In a further step 206, the projecting packaging portion 16 is severed.

In a further step 208, the object 14 is retrieved from the opened item of packaging 12.

The individual steps 202 to 208 of the method 200' for unpacking are preferably carried out in succession.

Figure 12B:
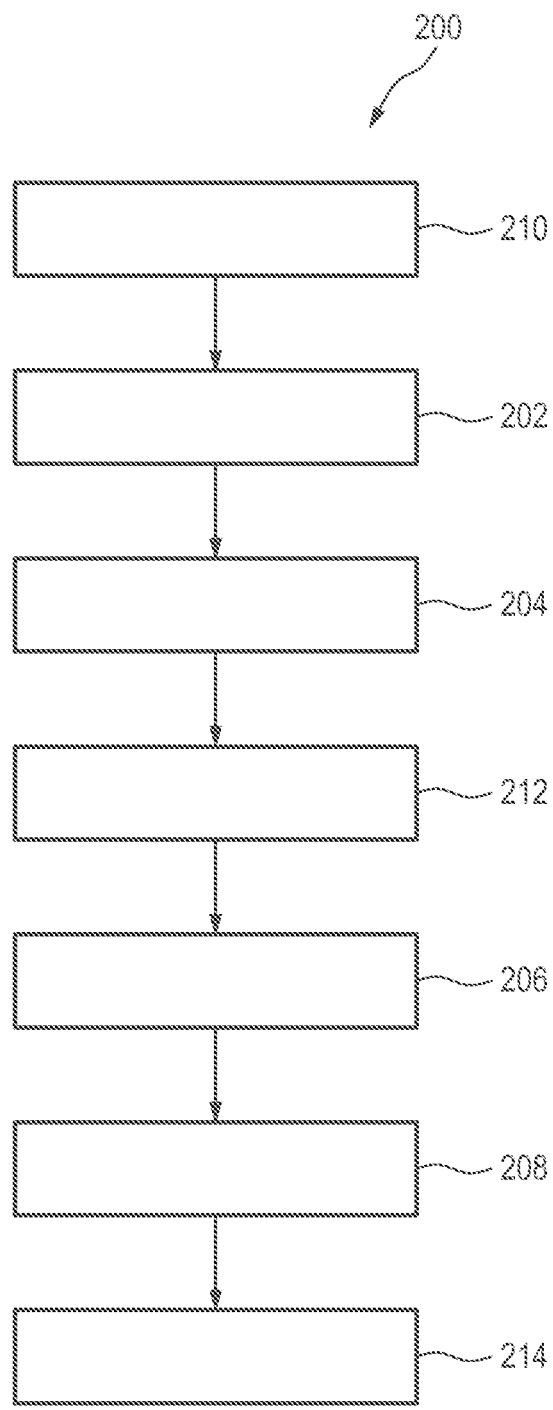
FIG. 12B shows a schematic illustration of a second embodiment of a method for unpacking.

FIG. 12 B shows a second embodiment of a method 200" for unpacking an object 14, in particular a pharmaceutical or cosmetic object, from an item of packaging 12, in particular a pouch. The object 14 is transported in a transportation direction 20 on a transportation installation 18. A packaging portion 16 of the item of packaging 12 initially is folded inwards between the transportation installation 18 and the item of packaging 12. The individual method steps will be described in more detail hereunder.

In a step 210, the object 14 is transported inwards on the transportation installation 18.

The object 14 in the step 210 of transporting inwards is preferably deflected in a first deflection portion 104, wherein the transportation direction 20 is changed, in particular wherein said directional change is 90°.

In a further step 202, the packaging portion 16 is folded outwards by means of the method 180 which is described in FIGS. 9 and 10a to 10c.

The method 180 herein can be carried out either by the embodiment of a method for folding outwards 180' described in FIG. 9, or by the embodiment of a method for folding outwards 180" described in FIG. 17.

In a further step 204, the projecting packaging portion 16 is stretched by means of the method 160 which is described in FIGS. 4 and 5a to 5d.

In a further step 212, the object 14 is transported onwards on the transportation installation 18.

The object 14 in the step 212 of transporting onwards is preferably deflected in a second deflection portion 110, wherein the transportation direction 20 is changed, in particular wherein this directional change is 90°.

In a further step 206, the projecting packaging portion 16 is severed.

In a further step 208, the object 14 is retrieved from the opened item of packaging 12.

In a further step 214, the object 14 is transported away on the transportation installation 18.

The object 14 in the step 214 of transporting away or in the step 212 of transporting onwards is preferably deflected in a third deflection portion 114 of the transportation installation 18, wherein the transportation direction 20 is changed, in particular wherein this directional change is 90°.

The object 14 in the step 214 of transporting away is preferably transported into a cleanroom 124.

The individual steps 210, 202, 204, 212, 206, 208, and 214 of the method 200" for unpacking are preferably carried out in succession.

Figure 13:
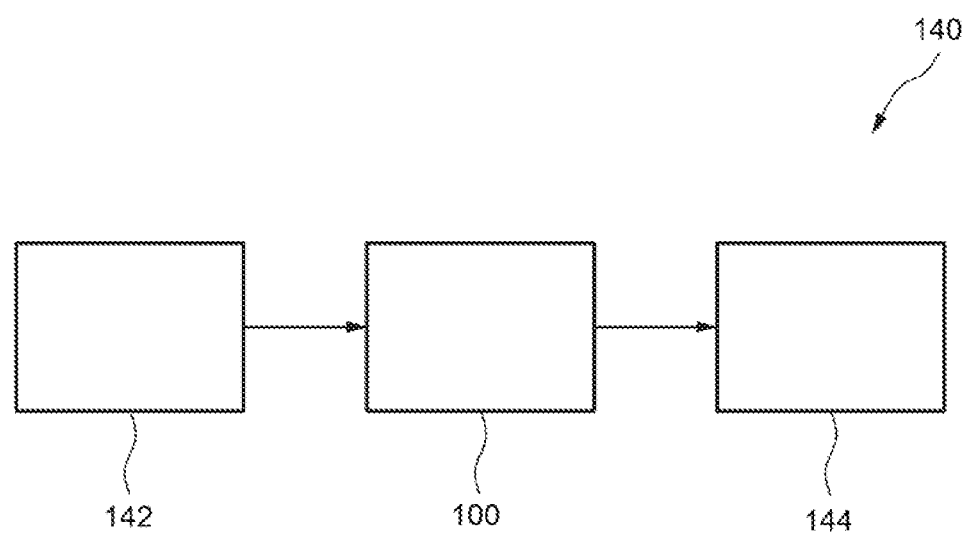
FIG. 13 shows a schematic illustration of an embodiment of a filling system.

FIG. 13 shows a schematic illustration of a filling system 140. Filling systems in general are configured for unpacking an object that stores a liquid, for filling, or transferring, respectively, the liquid into containers, and for subsequently packing the containers. To this end, the filling systems in most instances have an unpacking device, a filling device, and a packing device.

The filling system 140 described in FIG. 13 has upstream modules 142, an unpacking system 100, and downstream modules 144. The unpacking system 100 herein can correspond to the unpacking system 100 described in FIG. 11.

The upstream modules 142 can include at least one of the following modules:
- an infeed device for infeeding the packed object 14; and
- a positioning device for positioning the packed object 14 on the transportation installation 18, wherein the object 14 is positioned such that the packaging portion 16 in relation to the transportation direction 20 is disposed on an end side 28', 28" of the item of packaging 12 and is folded inwards between the item of packaging 12 and the transportation installation 18.

The downstream modules 144 can include at least one of the following modules:
- An opening device for opening the unpacked objects 14, wherein the objects 14 on that side thereof that faces away from the transportation installation (18) can have a protective film/foil or a lid in particular, wherein the opening device is configured for tearing off the protective film/foil or for opening the lid;
- a filling station for filling/transferring a liquid which is included in the unpacked object 14 into containers, in particular phials, syringes, etc.;
- a closing device for closing the filled containers, in particular with a lid;
- a packing device for packing the filled containers, and
- a discharging device for transporting away the filled containers.

Figure 15:
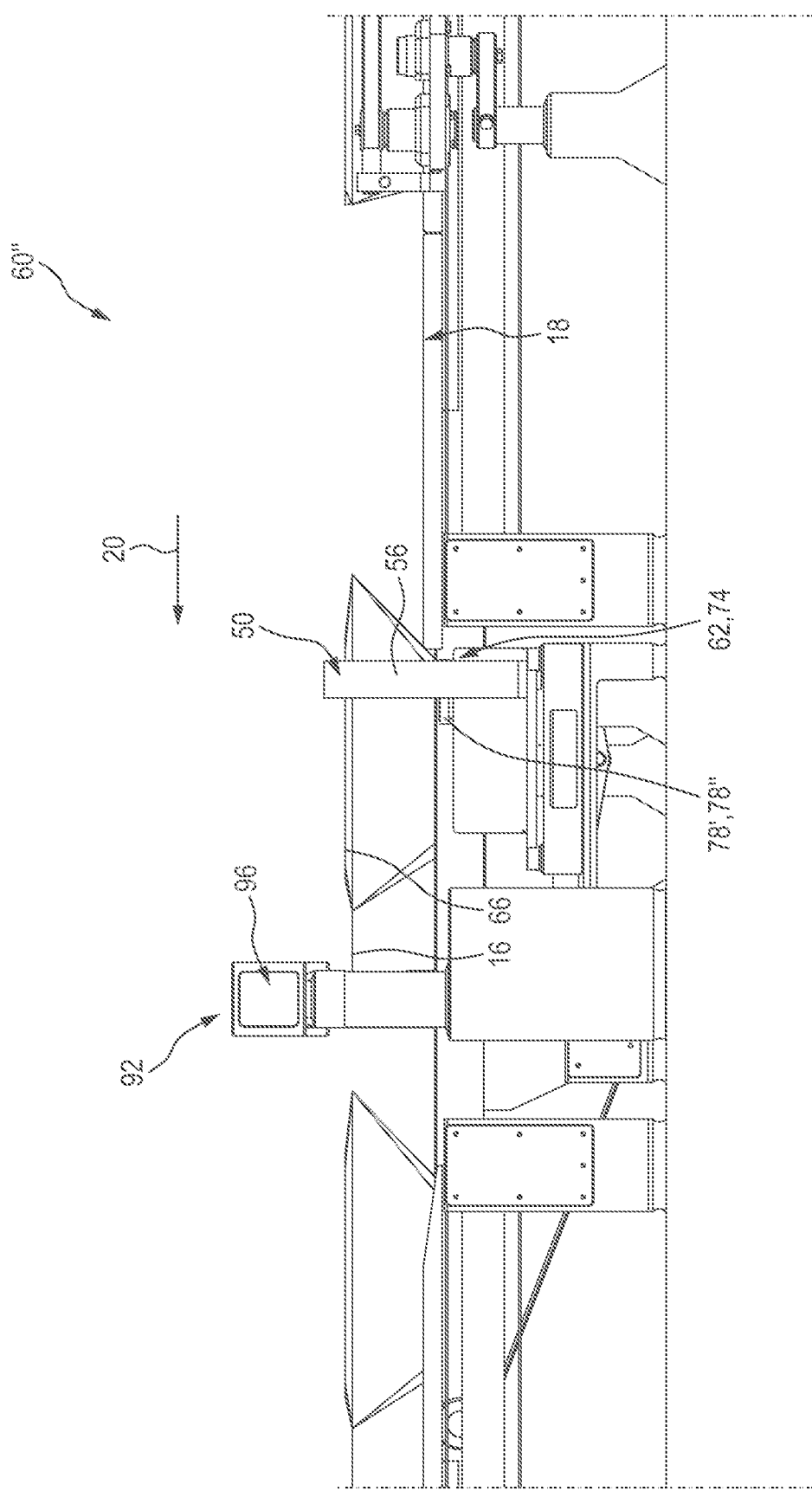
FIG. 15 shows a lateral view of the folding-out device in FIG. 14A.
Figure 16:
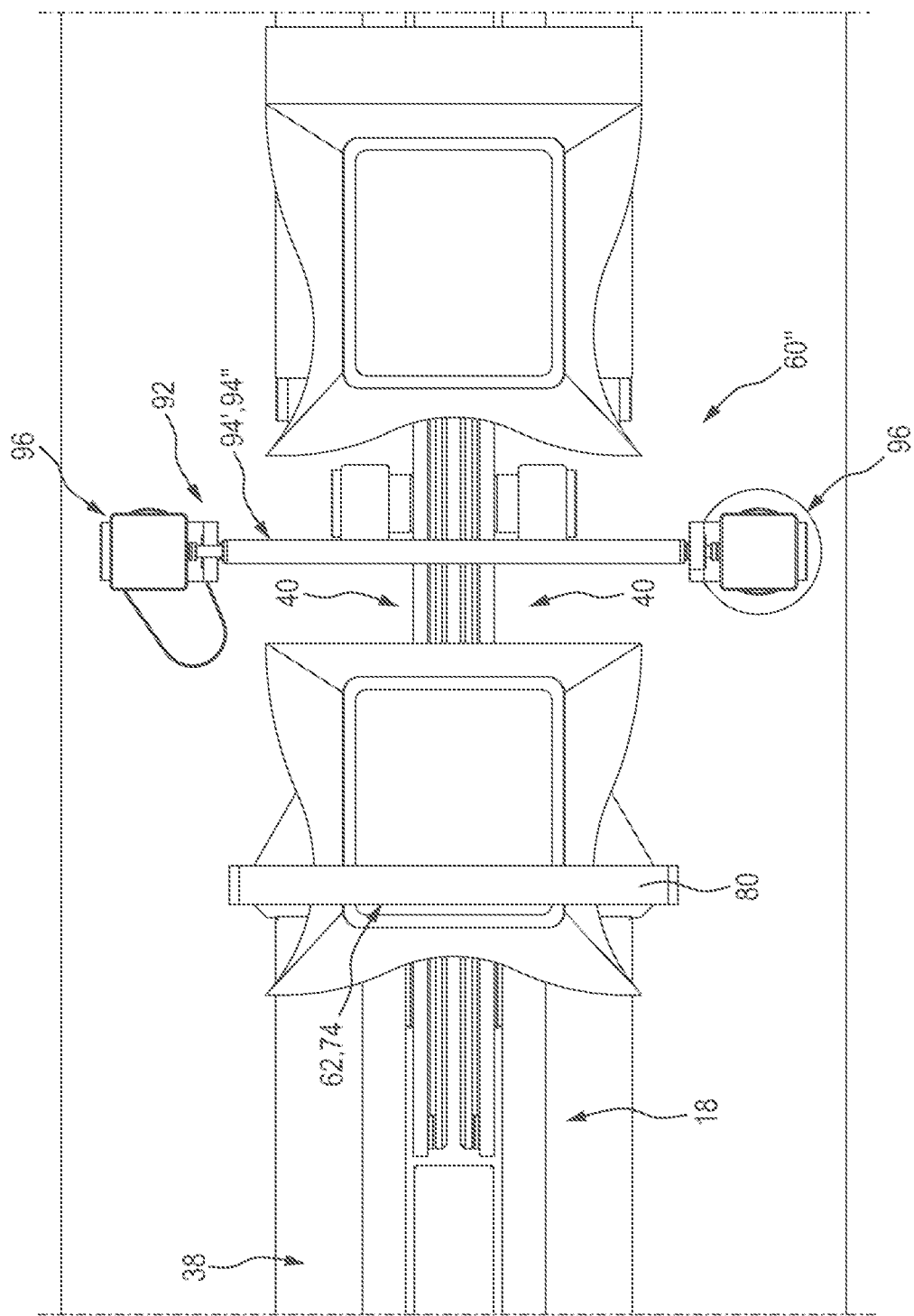
FIG. 16 shows a plan view of the folding-out device in FIG. 14A.

FIGS. 14A, 14B, 15, and 15 show an embodiment of a folding-out device 60". The folding-out device 60" is configured for folding outwards a folded-in packaging portion 16 of an item of packaging 12. An object 14 is packed in the item of packaging 12. The folding-out device 60" has a transportation installation 18, a lifting installation 62, and a detent installation 92.

The transportation installation 18 is configured for transporting the object 14 in a transportation direction 20. The item of packaging 12 in relation to the transportation direction 20 has an upstream end side 28" and a downstream end side 28'. The item of packaging 12 in relation to the transportation direction 20 furthermore has four longitudinal sides 30', 30", 30''', and 30''''. A longitudinal side 30' that faces the transportation installation 18 herein faces the transportation installation and is at least partially in contact with the transportation installation 18. The item of packaging 12 by way of the longitudinal side 30' that faces the transportation installation 18 accordingly bears on the transportation installation 18. An upper longitudinal side 30''' faces away from the transportation installation 18. Two lateral longitudinal sides 30" and 30'''' are disposed laterally to the transportation installation 18 and lie so as to be substantially perpendicular on the transportation installation 18.

The packaging portion 16 is connected to the remainder of the item of packaging 12 on the downstream end side 28' of the item of packaging 12. The packaging portion 16 initially extends along the downstream end side 28' in the direction of the longitudinal side 30' of the item of packaging 12 that faces the transportation installation 18 and further in part along the longitudinal side 30' of the item of packaging 12 that faces the transportation installation 18. The packaging portion 16 is thus partially disposed between the longitudinal side 30' of the item of packaging 12 that faces the transportation installation 18 and the transportation installation 18. The packaging portion 16 is thus initially folded inwards between the transportation installation 18 and the longitudinal side 30' of the item of packaging 12 that faces the transportation installation 18.

Alternatively, the packaging portion 16 can initially extend along the downstream end side 28' in the direction of the longitudinal side 30" of the item of packaging 12 that faces away from the transportation installation 18 and further in part along the longitudinal side 30''' of the item of packaging 12 that faces away from the transport installation 18. The packaging portion 16 is thus folded inwards onto the longitudinal side 30''' of the item of packaging 12 that faces away from the transportation installation 18.

The transportation installation 18 has a transportation plane 38 on which the object 14 and the item of packaging 12 are transported. The transportation installation 18 furthermore has clearances 40 on the two peripheries of the transportation plane 38 such that the item of packaging 12 and the object 14 bear on the transportation installation 18 and the transportation plane 38 only in a central region.

The lifting installation 62 is configured for raising the object 14 conjointly with the item of packaging 12. To this end, the lifting installation 62 has a vertical drive 76 for vertically moving the object perpendicularly to the transportation plane 38. The lifting installation 62 in the embodiment illustrated furthermore has a clamping installation 74 which is configured for therebetween jamming the item of packaging 12 and the object 14. The clamping installation 74 to this end has lifting elements 78', 78", and a detent element 80. The lifting elements 78', 78" are disposed such that said lifting elements 78', 78" in a vertical movement perpendicular to the transportation plane 78 are moved through the two clearances 40 of the transportation plane 38. The lifting elements 78', 78" have a contact face 82 which comes into contact with the longitudinal side 30' of the item of packaging 12 that faces the transportation installation 18. The contact face 82 herein, in particular in an upstream region of the longitudinal side 30' that faces the transportation installation 18 comes to bear on the longitudinal side 30' that faces the transportation installation 18. The vertical drive 76 is configured for moving the lifting elements 78', 78" perpendicularly to the transportation plane 38. The object 14 conjointly with the item of packaging 12 is thus movable perpendicularly to the transportation plane 38. The detent element 80 has a bearing face 84 on which the item of packaging 12 by way of the longitudinal side 30''' that faces away from the transportation installation 18 comes to bear when clamped. The bearing face 84 herein comes to bear on the longitudinal side 30''' that faces away from the transportation installation 18 in particular in an upstream region of the longitudinal side 30''' that faces away from the transportation installation 18. On account thereof, the item of packaging 12 and the object 14 are held between the lifting elements 78', 78", and the detent element 80. The lifting installation 62 furthermore has a frame 86 which includes the detent element 80 and connects the detent element 80 to the remaining components of the lifting installation 62, said remaining components largely being disposed on that side of the transportation installation 18 that faces away from the item of packaging 12. The frame 86, proceeding from the transportation plane 38, has a height 87' which is greater than a height 13' of the item of packaging 12. On account thereof, it can be avoided that the item of packaging 12 when transported on the transportation plane 38 comes into contact with the detent element 80, in particular scrapes along the latter or catches on the latter. Contact between the item of packaging 12 and the detent element 80 can be established only when the item of packaging 12 by way of the lifting elements 78', 78" is moved vertically away from the transportation plane 38 and comes to bear on the detent element 80. The frame 86 furthermore has a width 57" which is greater than a width 13" of the item of packaging 12 and is greater than a width 19 of the transportation installation 18. It can be avoided on account thereof that the item of packaging 12 when transported laterally comes into contact with the frame 86, in particular scrapes along the latter or catches on the latter.

The detent installation 92 is configured for forming a detent for the packaging portion 16. The detent installation 92 to this end has two rollers 94', 94", wherein a first roller 94' of the rollers 94', 94" is disposed on the longitudinal side 30' of the item of packaging 12 that faces the transportation installation 18, and a second roller 94" of the rollers 94', 94" is disposed on the longitudinal side 30''' of the item of packaging 12 that faces away from the transportation installation 18. Depending on which of the longitudinal sides the packaging portion is disposed, either the first or the second roller 94', 94" forms a detent for the folded-in packaging portion 16. The detent installation 92 furthermore has a translatory roller drive installation 96 which can move the rollers 94', 94" relative to one another and perpendicularly to the transportation direction 20.

Alternatively, the detent installation 92 can have only one roller 94. The roller 94 is disposed on that longitudinal side 30', 30''' onto which the packaging portion 16 is folded inwards.

FIG. 17 shows a further embodiment of a method 180" for folding outwards a packaging part 16 of an item of packaging 12, in particular a pouch, for an object 14, in particular pharmaceutical or cosmetic object. The folding-out device 60' which is described in FIGS. 14A to 16 is in particular suitable for carrying out the method 180" for folding outwards. The object 14 herein is transported in a transportation direction 20 on a transportation installation 18.

The packaging portion 16 can initially be folded inwards between the transportation installation 18 and the item of packaging 12, in particular a longitudinal side 30' of the item of packaging 12 that faces the transportation installation 18. Alternatively, the packaging portion 16 initially can also be folded inwards onto the longitudinal side 30''' of the item of packaging 12 that faces away from the transportation installation 18. The individual method steps will be described in more detail hereunder.

In a first step 182, the object 14 is raised from the transportation installation 18 by a lifting installation 62. The lifting installation 62 herein on that side of the item of packaging that faces away from the transportation installation 18 can have a detent element 80 against which the item of packaging 12 and the object 14 in the raising 182 of the object 14 are pushed. The lifting installation 62, on account thereof, is in particular configured for raising and holding the item of packaging 12 and the object 14.

The lifting installation 62 in the step of raising 182 preferably holds the item of packaging 12 on at least one lateral face 30', 30", 30''', 30''''.

Alternatively or additionally, the lifting installation 62 in the first step 182 can also raise the transportation installation 18, in particular the transportation plane 38 of the transportation installation 18, at least in the bearing region of the item of packaging 12 on the transportation plane 38.

In a second step 188, the lifting installation 62 and the detent installation 92 are moved relative to one another parallel with the transportation direction 20 in such a manner that the item of packaging 12 at least in portions is disposed on the detent installation 92, wherein a roller 94 of the detent installation 92 is disposed on a longitudinal side 30', 30''' of the item of packaging 12 in order for a detent for the packaging portion 16 to be formed.

The roller 94 prior to the step of moving 188 is preferably disposed such that the item of packaging 12 can at least partially pass the roller 94.

The roller 94 prior to the step of moving 188 is preferably disposed such that the roller 94 after the relative movement 188 bears on the longitudinal side of the item of packaging 12 on which the packaging portion 16 is folded inwards and forms a detent for the folded-in packaging portion 16.

Alternatively, the roller can also be disposed such that the roller 94 after the relative movement 188 is disposed on that side of the item of packaging 12 on which the packaging portion 16 is folded inwards and is not in contact with the item of packaging 12. The detent installation 92 can have a drive installation which moves the roller 94 perpendicularly to the transportation direction 20 and conveys the roller 94 so as to be in contact with the item of packaging and in this instance forms a detent for the folded-in packaging portion 16.

Additionally or alternatively, the detent installation 92 can have two rollers 94', 94", wherein a first roller 94' of the rollers 94', 94" is disposed on the longitudinal side 30' of the item of packaging 12 that faces the transportation installation 18, and a second roller 94" of the rollers 94', 94" is disposed on the longitudinal side 30''' of the item of packaging 12 that faces away from the transportation installation 18.

In this case, the rollers 94', 94" prior to the step of moving 188 are disposed such that the spacing between the rollers 94', 94" is so large that the item of packaging 12 can be moved relative to the rollers 94', 94" and through the latter. That roller of the rollers 94', 94" that is disposed on the longitudinal side onto which the packaging portion 16 is folded inwards is disposed such that said roller forms a detent for the packaging portion 16.

In a third step 190 the lifting installation 62 and the detent installation 92 are moved relative to one another parallel with the transportation direction 20 in such a manner that the folded-in packaging portion 16 is folded outwards. The folded-in packaging part 16 herein by means of the roller is pushed along the longitudinal side on which the packaging portion is disposed and, on account thereof, is folded outwards.

Figure 18C:
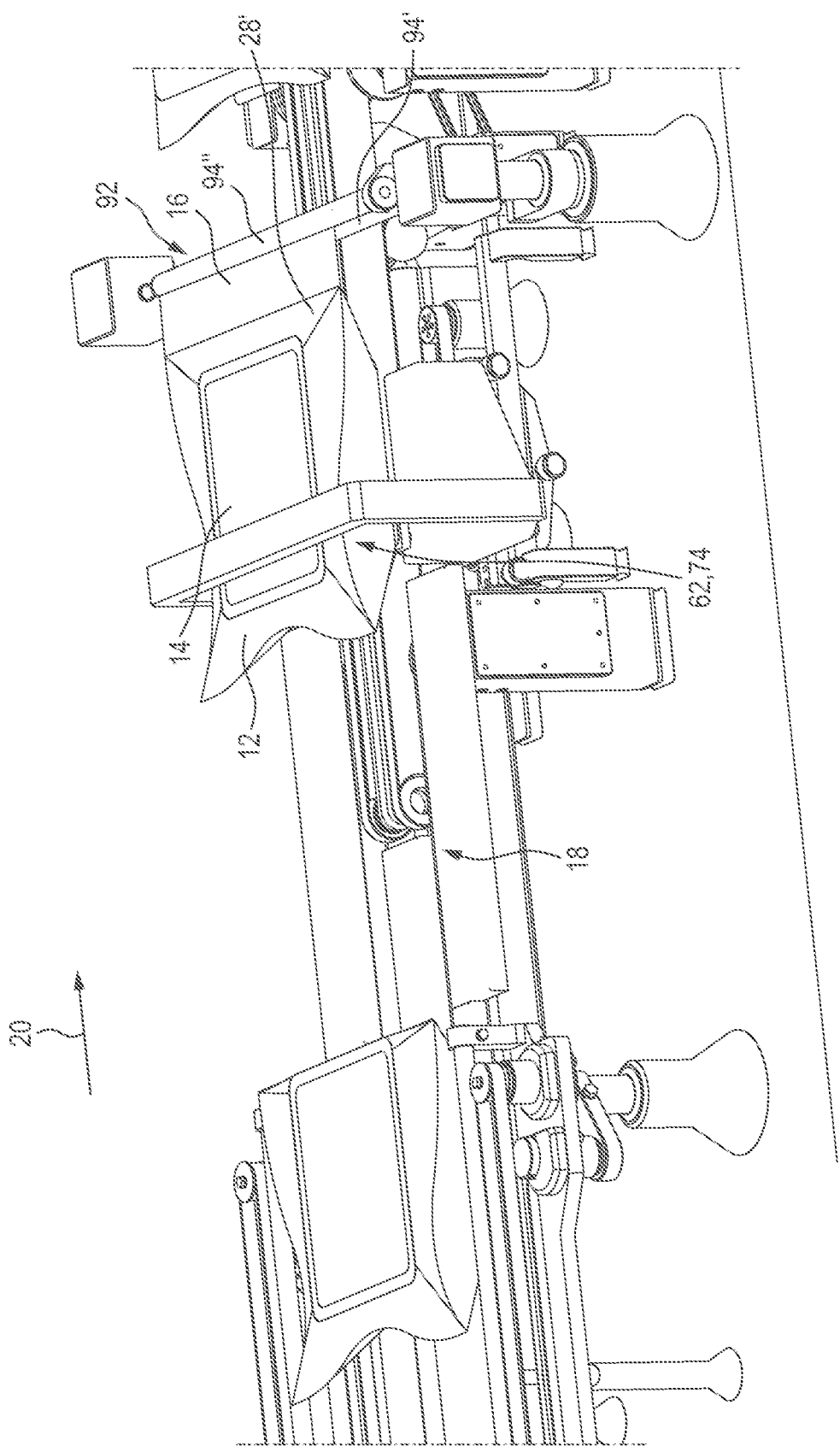
FIG. 18C shows an isometric illustration of the step for moving in the method for folding outwards in FIG. 17.

FIGS. 18A to 18C show an isometric illustration of the individual method steps of the method 180" for folding outwards the packaging portion 16, said method 180" being described in FIG. 17.

FIG. 18A shows the step of raising 182, in which the lifting installation 62 is disposed on that side of the object 14 that faces the transportation installation 18 and on account of a movement perpendicular to the transportation plane 38 is configured for raising the object 14 and the item of packaging 12. In one advantageous design embodiment the longitudinal side 30''' that herein faces away from the transportation installation 18 is pushed against a detent element 80. The detent element 80 herein comes into contact with an upstream region of the longitudinal side 30''' that faces away from the transportation installation 18. On account of the lifting installation 64 pushing the object 14 and the item of packaging 12 against the detent element 80, the object 14 and the item of packaging 12 are clamped and held on account thereof.

FIG. 18B shows an isometric illustration of the step of the first relative movement 188, in which the object 14 and the item of packaging 12 are moved through between the rollers 94', 94" so far until the rollers 94', 94" are disposed upstream of the packaging portion 16. The object herein by means of the lifting installation is moved downstream in the transportation direction 20. Prior to this step, the rollers 94', 94" are mutually spaced apart so far that the item of packaging 12 can be guided through between the rollers 94', 94". After the step of relative movement 188 the rollers 94', 94" downstream of the packaging portion 16 bear on the item of packaging 12, wherein the first roller 94' bears on the longitudinal side 30' that faces the transportation installation, and the second roller 94" bears on the longitudinal side 30''' that faces away from the transportation installation. The roller 94' forms a detent for the packaging portion 16.

FIG. 18C shows an isometric illustration of the step of the second relative movement 190, in which the object 14 and the item of packaging 12 are moved parallel with the transportation direction 20 such that the packaging portion 16 is moved against the roller 94", comes to bear on the roller 94", and on account of the object 14 and the item of packaging 12 being moved onwards is folded outwards in this direction. To this end, the object in the example of FIG. 18C by means of the lifting installation is moved upstream counter to the transportation direction 20. After the folding outwards, the rollers 94', 94" can optionally be moved relative to one another such that said rollers 94', 94" clamp the folded-out packaging portion. The packaging portion 16 in this instance can be stretched in a manner analogous to the embodiments of the stretching device 10 and to the method 160 for stretching from FIGS. 1A to 5D. It can be provided in particular that the detent installation 92 of the folding-out device 60" is identical to the holding installation 24 of the stretching device 10, and the rollers 94', 94" are identical to the rollers 26", 26'.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for stretching an item of packaging for an object, wherein the item of packaging has a projecting packaging portion, wherein the object is transported in a transportation direction on a transportation installation, wherein the method comprises the following method steps:
   holding the projecting packaging portion by a holding installation, wherein the holding installation has at least two rollers which are disposed so as to be perpendicular to the transportation direction, wherein the projecting packaging portion is held between the at least two rollers; and
   moving the object parallel with the transportation direction in order for the object and the holding installation to be moved away from one another,
   wherein the projecting packaging portion in relation to the transportation direction is disposed on a downstream end side, and wherein, in the moving step, the object is moved counter to the transportation direction and away from the holding installation.

2. The method according to claim 1, wherein in the step of moving a motion installation holds the item of packaging on at least one longitudinal side.

3. The method according to claim 1, wherein in the step of holding the at least two rollers therebetween draw in the projecting packaging portion.

4. The method according to claim 1, wherein in the step of holding the at least two rollers are rotated in mutually opposite directions, on account of which the projecting packaging portion is drawn in between the at least two rollers.

5. The method according to claim 1, wherein in the step of holding the at least two rollers are moved relative to one another, on account of which the at least two rollers therebetween jam the projecting packaging portion.

6. A method for unpacking an object from an item of packaging, wherein the object on a transportation installation is transported in a transportation direction, wherein the method comprises the following method steps:
   folding outwards a packaging portion by means of a method for folding outwards a packaging portion of an item of packaging for an object, wherein the method for folding outwards comprises the following method steps:
      raising the object by a lifting installation;
      holding a region of the item of packaging that is adjacent to the packaging portion by a first holding installation; and
      moving the first holding installation in a direction that points away from the packaging portion so that the packaging portion folds outwards as a projecting packaging portion;
   stretching the projecting packaging portion by means of a method for stretching an item of packaging for an object, wherein the method for stretching comprises the following method steps:
      holding the projecting packaging portion by a second holding installation, wherein the second holding installation has at least two rollers which are disposed so as to be perpendicular to the transportation direction, wherein the projecting packaging portion is held between the at least two rollers; and
      moving the object and/or the holding installation parallel with the transportation direction in order for the object and the holding installation to be moved away from one another;
   severing the projecting packaging portion; and
   retrieving the object from the item of packaging.

7. A method for unpacking an object from an item of packaging, the object is transported in a transportation direction by a transportation installation, and the item of packaging includes a packaging portion and a region adjacent to the packaging portion, wherein the method comprises the following steps:

folding outwards the packaging portion from a folded-in position to a folded-out position, wherein the folding outwards step further comprises the following:
- raising the item of packaging with a lifting installation that includes a vertical drive connected to a clamping installation, the clamping installation includes one or more lifting element(s), and the vertical drive moves the lifting element(s);
- holding the item of packaging with a first holding installation that includes a suction head connected to a hose and a vacuum generating installation, the suction head contacts the region adjacent to the packaging portion and holds the item of packaging in place; and
- moving the first holding installation with a holding installation drive installation that is connected to the holding installation, the holding installation drive installation moves the first holding installation in a direction that points away from the packaging portion while the suction head holds the item of packaging so that the packaging portion is folded outwards from the folded-in position to the folded-out position;

stretching the folded-out packaging portion, wherein the stretching step further comprises the following:
- holding the folded-out packaging portion with a second holding installation that includes at least two rollers arranged in a direction that is perpendicular to the transportation direction, the rollers clamp the folded-out packaging portion therebetween; and
- moving the item of packaging and/or the second holding installation while the object is still located within the item of packaging, the item of packaging and/or the second holding installation is moved so that the folded-out packaging portion is stretched;

severing the stretched and folded-out packaging portion from the remainder of the item of packaging; and retrieving the object from the item of packaging.

* * * * *